United States Patent
Jindal et al.

(10) Patent No.: US 11,824,760 B2
(45) Date of Patent: *Nov. 21, 2023

(54) METHODS AND APPARATUS FOR SUPPORTING NETWORK ACCESS USING CABLE AND RADIO COMMUNICATIONS LINKS

(71) Applicant: Charter Communications Operating, LLC, St. Louis, MO (US)

(72) Inventors: Manish Jindal, Lone Tree, CO (US); Pratik Das, Centennial, CO (US); Diwelawatte Jayawardene, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 304 days.

This patent is subject to a terminal disclaimer.

(21) Appl. No.: 17/228,681

(22) Filed: Apr. 12, 2021

(65) Prior Publication Data
US 2021/0234793 A1    Jul. 29, 2021

Related U.S. Application Data

(63) Continuation of application No. 15/820,302, filed on Nov. 21, 2017, now Pat. No. 10,979,343.

(51) Int. Cl.
*H04L 45/00* (2022.01)
*H04L 12/28* (2006.01)
(Continued)

(52) U.S. Cl.
CPC .......... *H04L 45/22* (2013.01); *H04L 12/2801* (2013.01); *H04L 12/2898* (2013.01);
(Continued)

(58) Field of Classification Search
CPC ..... H04L 45/22; H04L 47/745; H04L 47/822; H04L 12/2801; H04L 12/2898; H04L 67/60; H04W 4/00; H04N 21/2393
See application file for complete search history.

(56) References Cited

U.S. PATENT DOCUMENTS

2011/0083154 A1* 4/2011 Boersma ............... H04N 21/637
  725/116
2014/0219293 A1* 8/2014 Williams ............... H04L 5/0073
  370/468

* cited by examiner

*Primary Examiner* — Walter J Divito
*Assistant Examiner* — Anthony Luo
(74) *Attorney, Agent, or Firm* — Straub & Straub; Michael P. Straub; Stephen T. Straub

(57) ABSTRACT

Both wireless communication and communications via a cable modem are supported between a network node and a customer premises. Alternative communications links provide redundancy and the possibility to take advantage of the different types of links capacity to provide a level of service that would not be possible using a single communications link to a customer premises. In various embodiments a network node, such as a cable network node hubsite, has an optical connection to the Internet or another communications network and provides network access to one or a plurality of customer premises. The network node includes a wireless access point, e.g., pole mounted base station, as well as one or more cable modem interfaces to thereby allow for both wireless and cable modem based communications. This allows for packets of different applications to traverse different links and/or to switch between links in the event of maintenance or reliability issues.

20 Claims, 12 Drawing Sheets

(51) Int. Cl.
*H04L 47/74* (2022.01)
*H04L 47/00* (2022.01)
*H04W 4/00* (2018.01)
*H04L 67/60* (2022.01)
*H04N 21/239* (2011.01)
*H04L 47/70* (2022.01)

(52) U.S. Cl.
CPC .......... *H04L 47/745* (2013.01); *H04L 47/822* (2013.01); *H04W 4/00* (2013.01); *H04L 67/60* (2022.05); *H04N 21/2393* (2013.01)

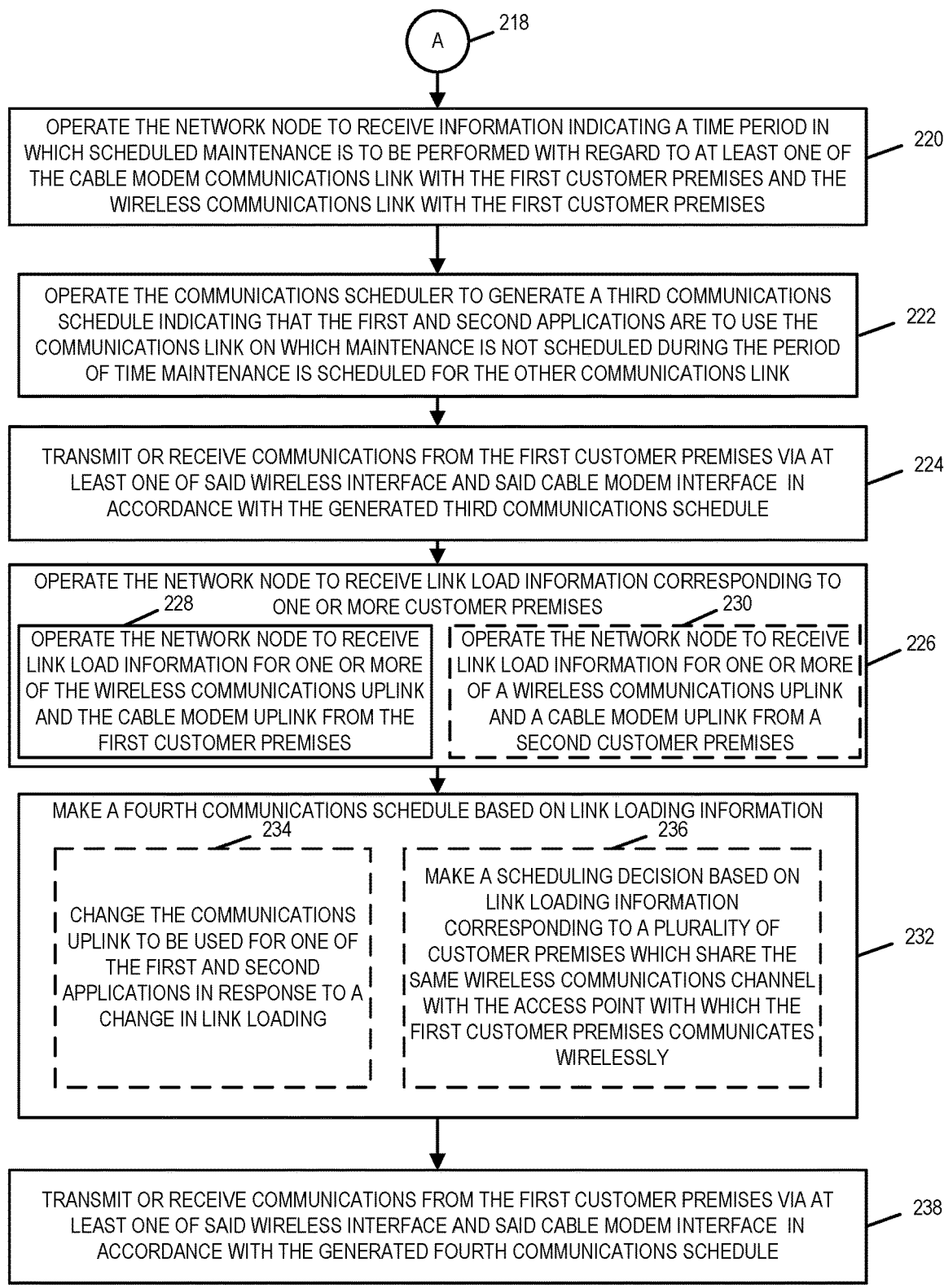

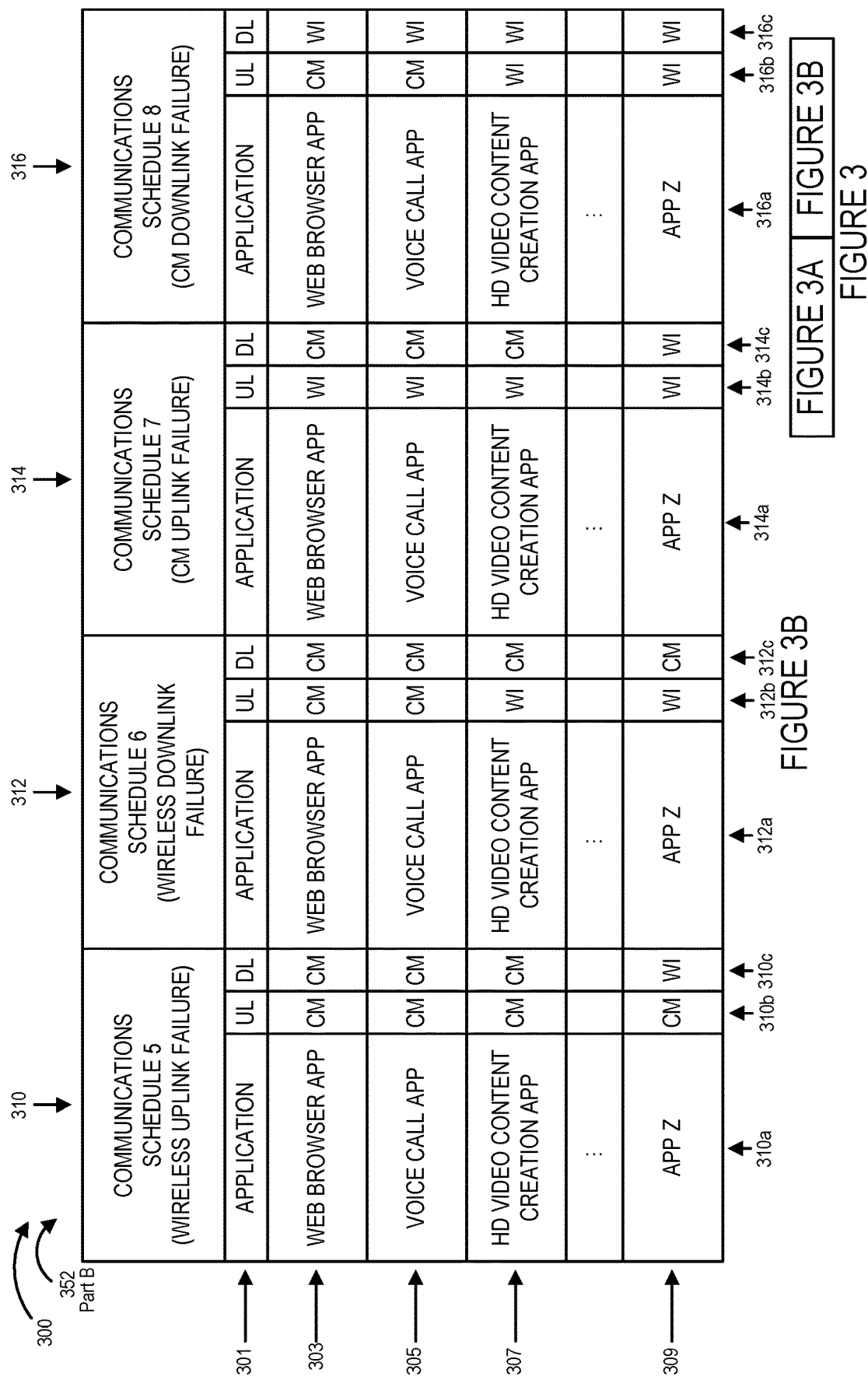

| FIGURE 5A |
| FIGURE 5B |

ASSEMBLY OF COMPONENTS (Part B) — 703, 738

740 — COMPONENT CONFIGURED TO OPERATE THE NETWORK NODE INCLUDING A COMMUNICATIONS SCHEDULER TO GENERATE A COMMUNICATIONS SCHEDULE USED TO CONTROL COMMUNICATIONS WITH A FIRST CUSTOMER PREMISES VIA BOTH A WIRELESS INTERFACE AND A CABLE MODEM INTERFACE

COMPONENT CONFIGURED TO OPERATE THE COMMUNICATIONS SCHEDULER TO GENERATE THE COMMUNICATIONS SCHEDULE BASED ON ONE OR MORE OF: APPLICATIONS IN USE BY THE FIRST CUSTOMER PREMISES, RECEIVED CABLE MODEM LINK QUALITY INFORMATION, MEASURED CABLE MODEM LINK QUALITY INFORMATION, RECEIVED WIRELESS CHANNEL QUALITY INFORMATION, MEASURED WIRELESS CHANNEL QUALITY INFORMATION, RECEIVED LINK LOAD INFORMATION, DETERMINED LINK LOAD INFORMATION, RECEIVED CABLE MODEM MAINTENANCE INFORMATION, RECEIVED WIRELESS MAINTENANCE INFORMATION, A CABLE MODEM COMMUNICATIONS CHANNEL FAILURE, OR A WIRELESS COMMUNICATIONS CHANNEL FAILURE

742 — COMPONENT CONFIGURED TO OPERATE THE COMMUNICATIONS SCHEDULER TO GENERATE A COMMUNICATIONS SCHEDULE FOR THE FIRST CUSTOMER PREMISES BASED ON COMMUNICATIONS LINK QUALITY INFORMATION CORRESPONDING TO THE FIRST CUSTOMER PREMISES, SAID LINK QUALITY INFORMATION INCLUDING AT LEAST ONE OF: WIRELESS DOWNLINK QUALITY INFORMATION, CABLE MODEM DOWNLINK QUALITY INFORMATION, WIRELESS UPLINK QUALITY INFORMATION OR WIRELESS DOWNLINK QUALITY INFORMATION

744 — COMPONENT CONFIGURED TO OPERATE THE COMMUNICATIONS SCHEDULER TO GENERATE A COMMUNICATIONS SCHEDULE INDICATING THAT THE FIRST AND SECOND APPLICATIONS ARE TO USE THE COMMUNICATIONS LINK ON WHICH MAINTENANCE IS NOT SCHEDULED DURING THE PERIOD OF TIME MAINTENANCE IS SCHEDULED FOR THE OTHER COMMUNICATIONS LINK

746 — COMPONENT CONFIGURED TO OPERATE THE COMMUNICATIONS SCHEDULER TO GENERATE A COMMUNICATIONS SCHEDULE BASED ON LINK LOADING INFORMATION

748 — COMPONENT CONFIGURED TO CHANGE THE COMMUNICATIONS UPLINK TO BE USED FOR ONE OF THE FIRST AND SECOND APPLICATIONS IN RESPONSE TO A CHANGE IN LINK LOADING

750 — COMPONENT CONFIGURED TO MAKE A SCHEDULING DECISION BASED ON LINK LOADING INFORMATION CORRESPONDING TO A PLURALITY OF CUSTOMER PREMISES WHICH SHARE THE SAME WIRELESS COMMUNICATIONS CHANNEL WITH THE ACCESS POINT WITH WHICH THE FIRST CUSTOMER PREMISES COMMUNICATES WIRELESSLY

754 — COMPONENT CONFIGURED TO OPERATE THE NETWORK NODE TO COMMUNICATE THE GENERATED COMMUNICATIONS SCHEDULE TO THE FIRST CUSTOMER PREMISES

756 — COMPONENT CONFIGURED TO OPERATE THE NETWORK NODE TO TRANSMIT OR RECEIVE COMMUNICATIONS FROM THE FIRST CUSTOMER PREMISES VIA AT LEAST ONE OF SAID WIRELESS INTERFACE AND SAID CABLE MODEM INTERFACE IN ACCORDANCE WITH THE GENERATED COMMUNICATIONS SCHEDULE

FIGURE 7B

| FIGURE 7A | FIGURE 7B |

FIGURE 7

METHODS AND APPARATUS FOR SUPPORTING NETWORK ACCESS USING CABLE AND RADIO COMMUNICATIONS LINKS

RELATED APPLICATIONS

The present application is a continuation of U.S. patent application Ser. No. 15/820,302 filed Nov. 21, 2017 which published as U.S. patent publication US 2019-0158382 A1 on May 23, 2019 and which is hereby expressly incorporated by reference in its entirety.

FIELD

The present application relates to communications systems, and more particularly to methods and apparatus hybrid communications systems in which cable and wireless communications links are supported.

BACKGROUND

Cable modem interfaces to the customer premises provide a reliable communications link with predictable transmission characterizes in many cases. While more recent cable standards have the promise of providing more symmetric data rates and/or higher data rates than current cable standards it is expected that many cable system deployments will continue to have asymmetric data channels with the uplink being considerably more limited that the downlink for many years to come. Accordingly, for some application such as HD video creation applications where a user may want to upload a large amount of data, currently deployed cable communications networks which use cable modems may have difficulty handling the large upload demands of HD video content and/or other data intensive applications where a user needs or desires to upload large amounts of data, e.g., for delivery to a content distribute or another party.

While upload limitations are one issue, another issue with relying solely on a cable modem based communication link as the sole communications link to a customer premises is one of resiliency. While cable modems are highly reliable, components associated with data communications over cable modems may suffer from failures, degradation and/or other issues resulting in the degradation of the ability for a user at a customer premises to communicate over the cable modem based communication link or have difficulties with such communications.

In addition to communications problems relating to component failure, in some cases maintenance may be required on one or more components of a cable modem system. In cases where the cable modem link is the sole communications link to a customer premise service may be interrupted for a period of time when one or more components associated with the cable modem communications link need to be replaced or serviced. Loss of complete data communications for even a short period of time for a business or residential customer can be traumatic and it is often highly desirable to avoid such a total loss of service even if it is for a brief scheduled maintenance period.

SUMMARY

In various embodiments both wireless communication and communications via a cable modem is supported between a network node and a customer premises. The dual alternative communications links provide redundancy as well as the possibility to take advantage of the different types of links capacity to provide a level of service that would not be possible using a single communications link to a customer premises.

In various embodiments a network node, such as a cable network node hubsite has an optical connection to the Internet or another communications network and provides network access to one or a plurality of customer premises. In at least some embodiments the network node includes a wireless access point, e.g., base station, as well as one or more cable modem interfaces to thereby allow for both wireless and cable modem based communications with one or more customer premises. The base station may, and sometimes does, include a pole mounted antenna, e.g., telephone or light pole mounted antenna, through which the network node can wirelessly communicate with one but often multiple customer premises in an area. Directional antenna beams may be, and sometimes are, used to support a high rate of communications, e.g., gigabit communications, with the customer preemies. The wireless interface can support symmetric uplink and downlink communications or asymmetric communications with, in some cases, the uplink channel supporting a higher data rate than the downlink wireless communications channel to a customer premises. The customer premises may, and often do, include an external antenna with a direct line of sight to the base station antenna.

For purposes of discussion it should be appreciated that customer premises may, and sometimes do, include residential premises but in other cases the customer premises include business premises such as in an office park. In fact, in the case of business where communications is critical to the success of the business, the methods and apparatus are particularly well suited as they provide a high degree of resiliency and service than in the case where cable modem communications is solely relied upon.

In various embodiments the network node includes a scheduler for scheduling use of communications links between the network node and the one or more customer premises to which the network node is coupled, e.g., wirelessly and via a cable modem interface. For scheduling purposes wireless and cable modem links are treated as alternative communications links with uplink and downlink communications being scheduled over each of the different types of supported links. The scheduler makes a joint scheduling decision on an individual customer basis taking into consideration the applications, e.g., voice, HD video content creation, Web Browser and/or other applications running at a customer premise. Uplink and/or downlink traffic for a customer application is scheduled over the wireless or cable modem link depending on a variety of different types of information including link quality information, the amount of data to be transmitted in a given direction, planned maintenance information, etc. The scheduler communicates to the customer premise device at a given location, e.g., an integrated network device including a cable modem and wireless interface, a schedule to be used in determine which communications link to use to transmit data corresponding to a particular application at a given time. Uplink and downlink traffic data may be, and sometimes are, transmitted over different links for the same application. For example, for video content creation applications a high capacity wireless communications link may be used for a period of time to upload content while downlink traffic such as acknowledgements from a device to which the content is transmitted via the Internet may be communicated over the cable modem interface.

While under normal conditions the scheduler may exhibit a preference for transmitting data corresponding to some types of applications over one type of link than the other, in at least some embodiments link quality is monitored and the scheduler takes into consideration changes in link quality and thus the reliability and/or bandwidth available over a given link. In some embodiments the customer premises device reports downlink quality information for both the wireless communications link and the cable modem communications link to the network node. In some embodiments the communications link quality information is transmitted over the wireless or cable modem link to which the information relates while in other cases link quality for one type of link is communicated over the other link. For example in some embodiments cable modem link quality is fed back over the wireless communications link in addition to wireless link communications quality. The link quality information may be in the form of an error rate, interference measurement and/or some other channel quality metric. In the case of a detected link failure, the failed link is reported over the link which remains intact. For example if failure of the cable modem link is detected by a customer premise device is detected, in some embodiments the failure and related diagnostic information is communicated back to the network node via the wireless link to the customer premise device. Similarly, if a wireless link or hardware failure is detected at the customer premise, the failure and related diagnostic information is reported via the cable modem link. Failures detected at the network node are similarly communicated to a customer premise device via the remaining link. While downlink quality is often measured at the customer premise device uplink quality is normally measured at the receiving device of the network node, e.g., at the wireless receive or cable modem of the network node.

The scheduler takes into consideration changes in link quality, loading and or other factors in generating an updated communications schedule for the customer premise or premised coupled to the network node. The update schedule for a customer premise is communicated to the customer premise device at an individual customer premises and used to determine which link packets are to be transmitted and/or received on for a particular application. As link quality changes or a link fails, the link a customer premise device is to use for an application may be, and sometimes is, changed.

The scheduler at the network node also receives information about planned system maintenance. The scheduler takes this information into account when scheduling communications and indicates to the customer premises devices to switch to the link which will not be affected by the maintenance when the maintenance will result in an interruption to service provided via a particular link. For example if a customer premises is to have work preformed on the cable or cable modem at the customer premises, the customer premises device at the customer premises has its communications schedule updated to switch all applications to the wireless link between the customer premises and the network node before the applications at the customer node are affected by the scheduled maintenance. In this way maintenance on the cable modem and/or wireless communications links can be scheduled without service interruptions to an individual customer or customers.

It should be apparent that the joint wireless/cable modem communications scheduling approach on a per application and customer premises basis allows for a wide degree of flexibility in terms of link load balancing at a network node while facilitating network resiliency and maintenance.

An exemplary communications method, in accordance with some embodiments, comprises: operating a network node including a communications scheduler to generate a first communications schedule used to control communications with a first customer premises via both a wireless interface and a cable modem interface; and transmitting or receiving communications from the first customer premises via at least one of said wireless interface and said cable modem interface in accordance with the generated first communications schedule. A exemplary network node, in accordance with some embodiments, comprises: a wireless interface; a cable modem interface; a communications scheduler; and a processor configured to: operate the communications scheduler included in the network node to generate a first communications schedule used to control communications with a first customer premises via both a wireless interface and a cable modem interface; and operate the network node to transmit or receive communications from the first customer premises via at least one of said wireless interface and said cable modem interface in accordance with the generated first communications schedule.

Numerous additional features and embodiments will be apparent in view of the detailed description which follows.

BRIEF DESCRIPTION OF THE FIGURES

FIG. 2B is a second part of a flowchart of an exemplary communications method in accordance with an exemplary embodiment.

FIG. 2 comprises the combination of FIG. 2A and FIG. 2B.

FIG. 3B is a second part of a table of exemplary generated communications schedules in accordance with an exemplary embodiment.

FIG. 3 comprises the combination of FIG. 3A and FIG. 3B.

FIG. 7B is a drawing of a second part of an assembly of components, which may be included in a network node, e.g., a hubsite network node, in accordance with an exemplary embodiment.

FIG. 7 comprises the combination of FIG. 7A and FIG. 7B.

DETAILED DESCRIPTION

Figure 1:
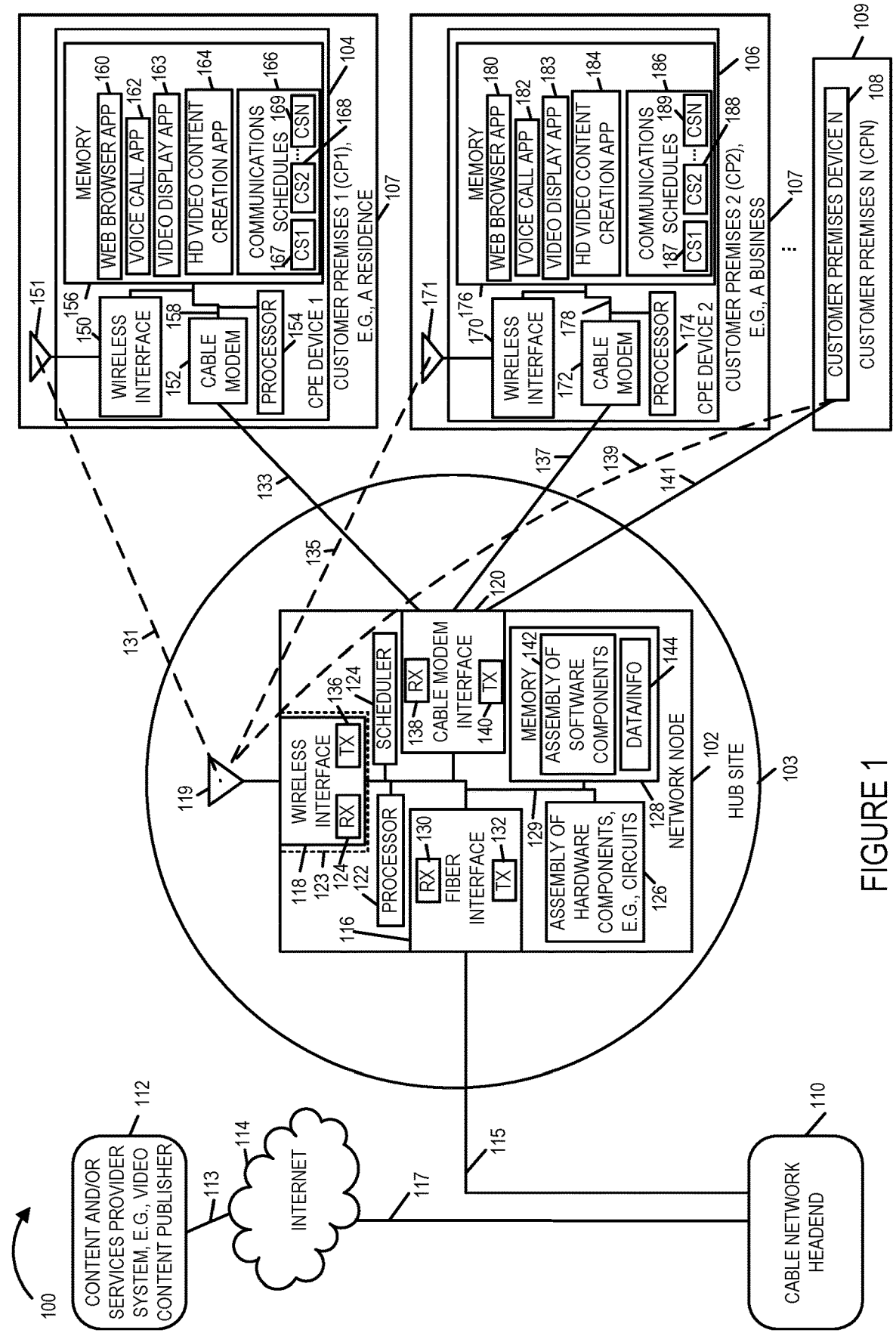
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a network node 102, a plurality of customer premises equipment (CPE) devices (CPE 1 device 104, CPE 2 device 106, . . . , CPE device N 108), a cable network headend 110, content and/or services provider system 112, e.g., a video content publisher, and the Internet 114, coupled together as shown in FIG. 1.

Network node 102, which located at hub site 103, serves a plurality of customer premises (customer premises 1 (CP1) 105, e.g., a residence, customer premises 2 (CP2) 107, e.g., a business, . . . , customer premises N (CPN) 109). CPE device 1 104 is located at customer premises 1 105. CPE device 2 106 is located at customer premises 2 107. CPE device N 108 is located at customer premises N 109.

Network node 102 includes a fiber interface 116, a wireless interface 118, a cable modem interface 120, a processor 122, e.g., a CPU, a scheduler 124, an assembly of components 126, e.g., an assembly of circuits, and memory 128 coupled together via a bus 129 over which the various elements may interchange data and information. Fiber interface 116 includes a receiver 130 and a transmitter 132 via which the network node may receive send signals over fiber cable 115 to cable network headend 110. Wireless interface 118 includes receiver 1124 and transmitter 136, which are coupled to antenna 119, via which the network node may receive wireless uplink signals and send wireless downlink signals to CPE devices (104, 106, . . . , 108). In some embodiments, multiple antennas are used in place of a single antenna 119. In some embodiments, different antennas are used for uplink and downlink communications. In some embodiment, wireless interface 118 is part of wireless access point 123, which is included in network node 102. In some embodiments, the wireless access point is a pole mounted wireless access point. Cable module interface 120 includes receiver 138 and transmitter 140 via which the network node can receive uplink signals and send downlink signals to CPE devices (104, 106, . . . , 108).

Memory 128 includes an assembly of software components 142 and data/information 144. Scheduler 124, e.g., a communications scheduler, generates communications schedules for communications between network node 102 and CPE devices (104, 106, . . . , 108) based on application, loading information, channel quality information, maintenance schedule information, detected failures, and/or loading information. In various embodiments, the communications scheduler assigns, e.g., as part of a generated communications schedule, one of either: (i) a wireless communications channel or (ii) a cable modem communications channel to a customer premises device, e.g., CPE device 104, on a per application and per uplink or downlink basis.

Customer premises equipment (CPE) device 1 104 includes a wireless interface 150, a cable modem 152, a processor 154, and memory 156 coupled together via a bus 158 over which the various elements may interchange data and information. Wireless interface 150 includes a wireless receiver and a wireless transmitter, which are coupled to antenna 151 via which CPE device 1 104 may receive downlink wireless communications channel signals from network node 102 and transmit uplink wireless communications channel signals to network node 102. Dashed line 131 represents a wireless link between CPE device 104 and network node 102, and the wireless link may, and sometimes does, include both an uplink wireless communications channel and a downlink wireless communications channel. In some embodiments, a plurality of antennas is used in place of single antenna 151. cable modem 152 includes a receiver and a transmitter, via which CPE device 1 104 may receive downlink cable communications channel signals from network node 102 and transmit uplink cable communications channel signals to network node 102. Solid line 132 represents a cable link between CPE device 1 104 and network node 102, and the cable link may, and sometimes does, include both an uplink communications channel and a downlink communications channel.

Memory 156 includes a plurality of applications (web browser application 160, voice call application 162, video display application 163, high definition (HD) video content creation application 164), and communications schedules (communications schedule 1 167, communications schedule 2 168, . . . , communications schedule N 169). Different communications schedules correspond to different times and/or different conditions, e.g., different channel conditions, different loading conditions, maintenance and non-maintenance time intervals, a particular detected failure condition, etc. Drawing 300 of FIG. 3 illustrates several exemplary different generated communications schedules.

Customer premises equipment (CPE) device 2 106 includes a wireless interface 170, a cable modem 172, a processor 174, and memory 176 coupled together via a bus 178 over which the various elements may interchange data and information. Wireless interface 170 includes a wireless receiver and a wireless transmitter, which are coupled to antenna 171 via which CPE device 2 106 may receive downlink wireless communications channel signals from network node 102 and transmit uplink wireless communications channel signals to network node 102. Dashed line 135 represents a wireless link between CPE device 2 106 and network node 102, and the wireless link may, and sometimes does, include both an uplink wireless communications channel and a downlink wireless communications channel. In some embodiments, a plurality of antennas is used in place of single antenna 171. Cable modem 172 includes a receiver and a transmitter, via which CPE device 2 106 may receive downlink cable communications channel signals from network node 102 and transmit uplink cable communications channel signals to network node 102. Solid line 137 represents a cable link between CPE device 2 106 and network node 102, and the cable link may, and sometimes does, include both an uplink communications channel and a downlink communications channel.

Memory 176 includes a plurality of applications (web browser application 180, voice call application 182, video display application 183, high definition (HD) video content creation application 184), and communications schedules (communications schedule 1 187, communications schedule 2 188, . . . , communications schedule N 189). Different communications schedules correspond to different times and/or different conditions, e.g., different channel conditions, different loading conditions, maintenance and non-maintenance time intervals, a particular detected failure condition, etc.

Customer premises device N 108 includes similar components to the components shown in CPE device 1 104 and CPE device 2 106. CPE device N 108 is coupled to network node 102 via wireless communications link 139 and cable communications link 141.

Fiber interface 116 of network node 102 is coupled to cable network headend 110 via fiber cable 115. Cable network headend 110 is coupled to the Internet 114 via communications link 117, e.g., a fiber cable. Content and/or services provider system 112 is coupled to the Internet 114 via communications link 113, e.g., a fiber cable. In some embodiments, the content and/or services provider system 112 is a content server that stores material from an enterprise.

Figure 2A:
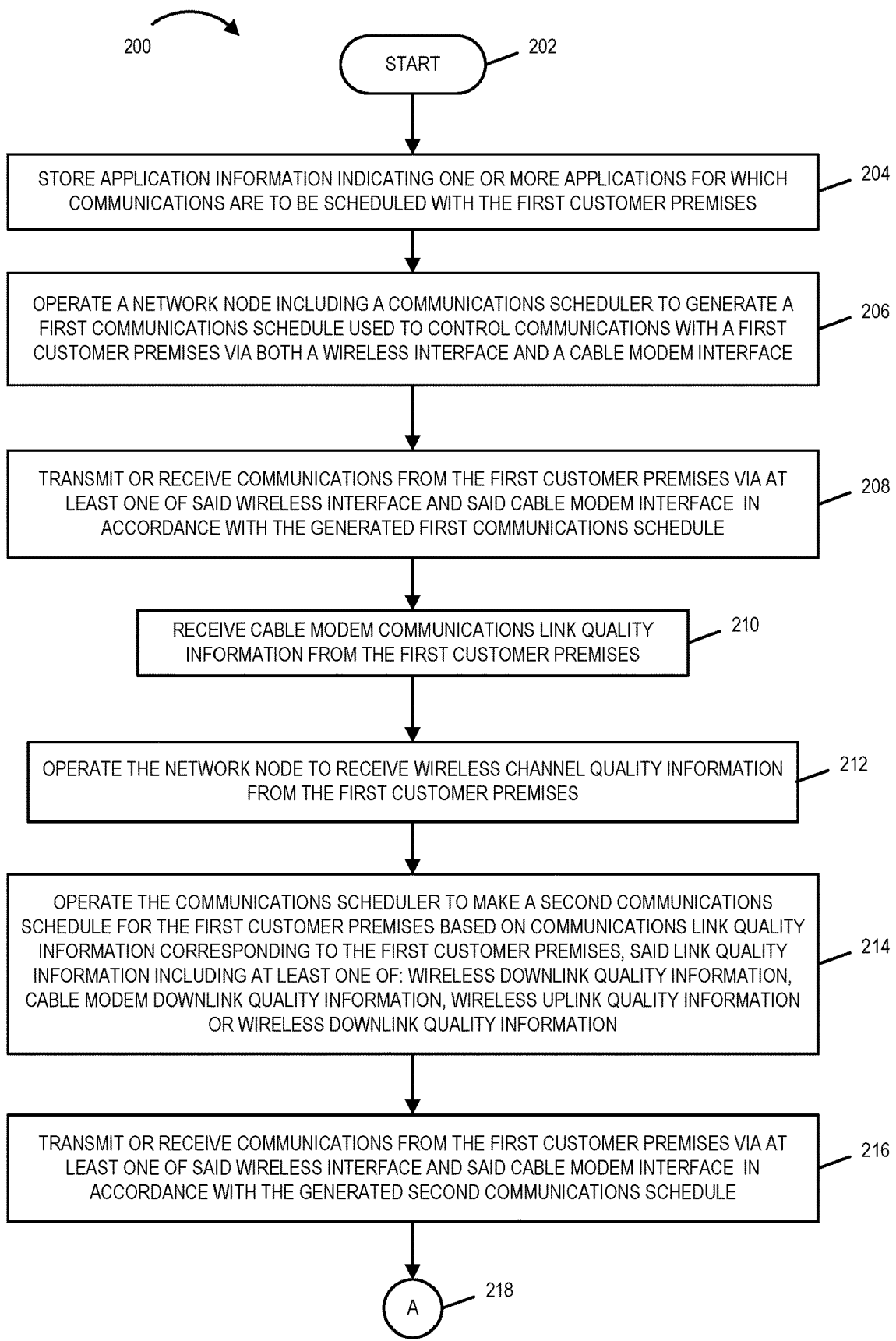
FIG. 2A is a first part of a flowchart of an exemplary communications method in accordance with an exemplary embodiment.

FIG. 2, comprising the combination of FIG. 2A and FIG. 2B, is a flowchart 200 of an exemplary communications method in accordance with an exemplary embodiment. Operation starts in step 202 in which a network node, e.g., network node 102 of system 100 of FIG. 1, is powered on and initialized. Operation proceeds from step 202 to step 204, in which the network node stores application information including information indicating one or more applications for which communications are to be scheduled for a first customer premises, e.g., for customer premises 1 105. Operation proceeds from step 204 to step 206.

In step 206, the network node including a communications scheduler is operated to generate a first communication schedule used to control communications with the first customer premises via both a wireless interface, e.g., wireless interface 118, and a cable modem interface, e.g., cable modem interface 120. In some embodiments, the first communications schedule includes information on a per application and per customer premises basis indicating whether an application is to use the wireless interface or cable modem interface for a scheduled communications time period. In some such embodiments, the first communications schedule includes an uplink schedule portion and a downlink schedule portion, said uplink schedule portion including one or more identifiers, said one or more identifiers identifying on a per application basis one of the wireless interface or cable module interface to be used by the first customer premises for uplink communications corresponding to a first application.

In one exemplary embodiment, the first application is a HD video content creation application and the first uplink identifier identifies that the wireless interface is the interface to be used for uplink communications corresponding to the first application. For example, the first application may be a HD video content creation application and wireless interface uplink may be used for transmission of content created for the application because of large size, e.g., when content is posted to a content distributer or sent to another party for further editing/processing. In some embodiments, the uplink schedule portion of the first communications schedule further includes a second uplink identifier identifying one of the wireless interface or cable modem interface to be used by the first customer premises for uplink communications corresponding to a second application, e.g., an Internet web browser or voice call application. In some embodiments, the second uplink identifier in the first communications schedule indicates that uplink communications corresponding to the second application will be send using the cable modem.

In some embodiments, the downlink schedule portion of the first communications schedule includes a first downlink identifier that identifies one of the one of the wireless interface or cable modem interface to be used for downlink communications corresponding to the first application, the identified one of the wireless interface or cable modem interface to be used for downlink communications for the first application being the same or different than the identified one of the wireless interface or cable modem interface to be used for uplink communications for the first application. In some such embodiments, the downlink schedule portion includes a second downlink identifier that identifies one of the one of the wireless interface or cable modem interface to be used for downlink communications corresponding to the second application, the identified one of the wireless interface or cable modem interface to be used for downlink communications for the second application being the same or different than the identified one of the wireless interface or cable modem interface to be used for uplink communications for the second application. Operation proceeds from step 206 to step 208.

In step 208 the network node transmits or receives communications from the first customer premises via at least one of said wireless interface and said cable modem interface in accordance with the generated first communications schedule. Operation proceeds from step 208 to step 210.

In step 210 the network node receives cable modem communications link quality information from the first customer premises. Cable modem communications link quality information includes, e.g., feedback information such as packet error rate or interference measurement information sent via the cable modem and/or over the wireless link providing interference information and/or error rate information for the cable modem downlink. In some embodiments, the network node measures the uplink channel quality for the cable modem communications link with the first customer premises based on the interference it detects. Operation proceeds from step 210 to step 212.

In step 212 the network node is operated to receive wireless channel quality information from the first customer premises. The received wireless channel quality information includes, e.g., downlink quality information such as interference information and/or error rate information for the wireless downlink sent as feedback information over the wireless connection or over the cable modem link to the network node. In various embodiments, feedback for either link, wireless link or cable modem link can, and sometimes does, go over the other link in addition to the link to which the feedback relates. In some embodiments, the network node measures the uplink channel quality for the wireless communications link with the first customer premises based on the interference it detects. Operation proceeds from step 212 to step 214.

In step 214 the communications scheduler is operated to make, e.g., generate, a second communications schedule for the first customer premises based on communications link quality information corresponding to the first customer premises, said link quality information including at least one of: wireless downlink quality information, cable modem downlink quality information, wireless uplink quality information, or wireless downlink quality information.

In some embodiments, the communications link quality indicates a degradation of link quality on the cable modem communications link and the generated second communications schedule includes an indicator indicating that at least one of the first and second applications at the first customer premises is to switch from the cable modem communications link to the wireless communications link for at least one of uplink and downlink communications corresponding to the first application. For example, by including a different link indicator than in the first communications schedule for a particular application/communications direction in the second communications schedule, the scheduler indicates the change. For example, an indicator is changed from indicating cable modem communications link to wireless communications link for at least one of the first and second application for at least one of the uplink and downlink, in response to a detected degradation in link quality on the cable modem communications link. As another example an indicator is changed from indicating the wireless communications link to cable modem communications link for at least one application for at least one of the uplink and downlink, in response to a detected degradation in link quality on the wireless communications link.

In some embodiments, an indicated degradation in link quality indicates increased interference on the link or a complete failure in the link. In some such embodiments, in response to a degradation level above an acceptable threshold for the cable modem link or a complete failure of the cable modem link, the indicators are set for each of the applications to indicate that the wireless communications link is to be used. In some such embodiments, in response to a degradation level above an acceptable threshold for the wireless link or a complete failure of the wireless link, the indicators are set for each of the applications to indicate that the cable modem communications link is to be used. Operation proceeds from step 214 to step 216.

In step 216 the network node is operated to transmit or receive communications from the first customer premises via at least one of said wireless interface and said cable modem interface in accordance with the generated second communications schedule. Operation proceeds from step 216, via connecting node A 218, to step 220.

In step 220 the network node is operated to receive information indicating a time period in which scheduled maintenance is to be performed with regard to the cable modem communications link with the first customer premises and the wireless communications link with the first customer premises. Operation proceeds from step 220 to step 222.

In step 222 the communications scheduler is operated to generate a third communications schedule indicating that the first and second applications are to use the communications link on which maintenance is not scheduled during the period of time in which maintenance is scheduled for the other communications link. Operation proceeds from step 222 to step 224.

In step 224 the network node is operated to transmit or receive communications from the first customer premises via at least one of said wireless interface and said cable modem interface in accordance with the generated third communications schedule. Operation proceeds from step 224 to step 226.

In step 226 the network node is operated to receive link loading information corresponding to one or more customer premises. Step 226 includes step 228 and, in some embodiments step 230. In step 228 the network node is operated to receive link loading information for one or more of the wireless communications uplink and the cable modem uplink from the first customer premises. In some embodiments, receiving the link loading information includes receiving uplink queue information for one or more applications and links via the wireless communications link and/or cable modem communications link.

In step 230 the network node is operated to receive link loading information for one or more of a wireless communications uplink and a cable modem uplink from a second customer premises. Operation proceeds from step 226 to step 232.

In step 232 the network node, e.g., the network node communication scheduler, is operated to make a fourth communications schedule based on link loading information. Step 232 may, and sometime does, include one or both of steps 234 and 236. In step 234 the network node is operated to change the communications link to be used for one of the first and second application, e.g., with regard to the first customer premises, in response to a change in link loading. In step 236 the network node is operated to make a scheduling decision based on link loading information corresponding to a plurality of customer premises which share the same wireless communications channel with the access point with which the first customer premises communicates wirelessly. Operation proceeds from step 232 to step 238.

In step 238 the network node transmits or receives communications from the first customer premises via at least one of said wireless interface and said cable modem interface in accordance with the fourth communications schedule.

Figure 3A:
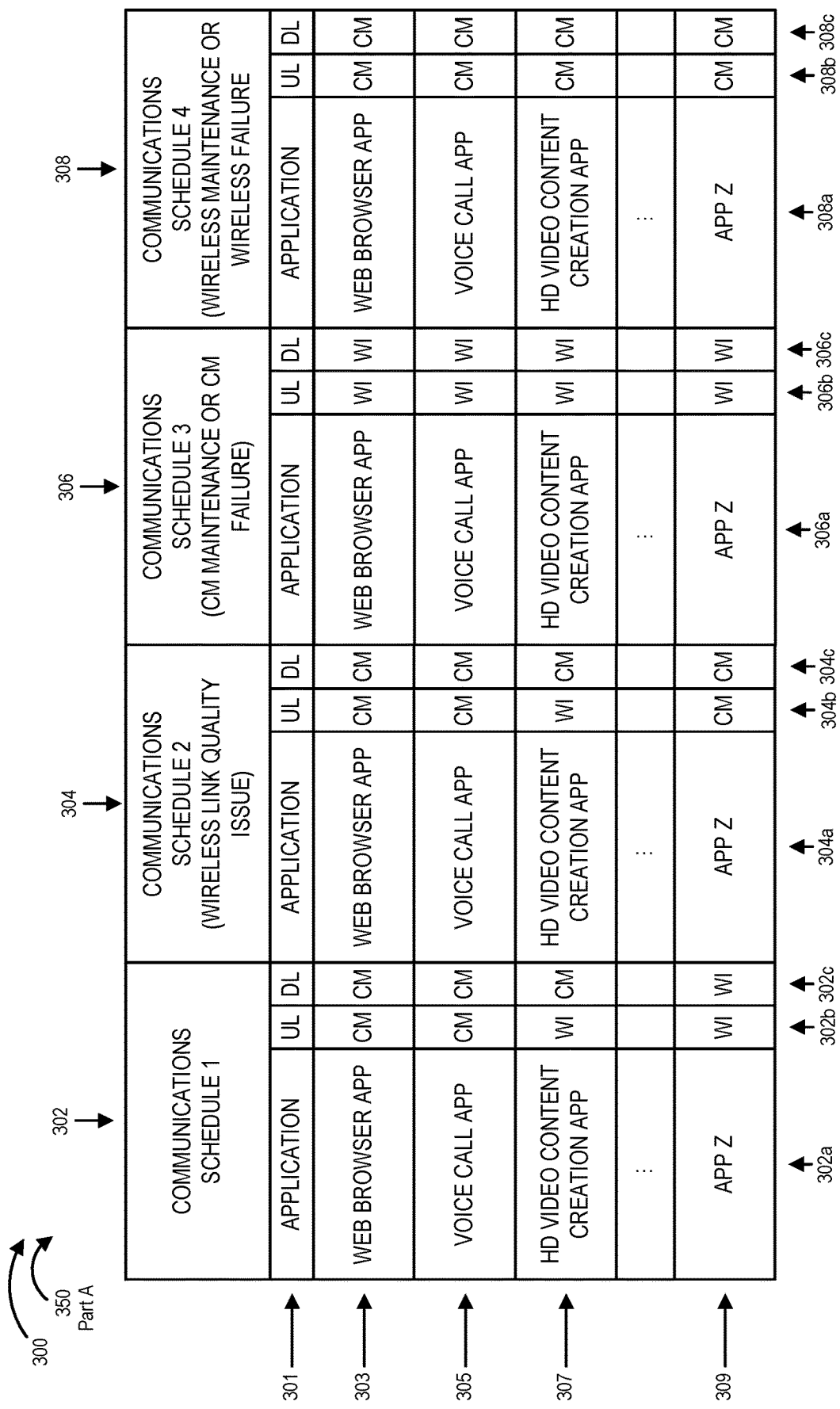
FIG. 3A is a first part of a table of exemplary generated communications schedules in accordance with an exemplary embodiment.

FIG. 3, comprising the combination of FIG. 3A and FIG. 3B, is an exemplary table 300, comprising the combination of Part A 350 and Part B 352, illustrating exemplary communications schedules which may be generated, e.g., by scheduler 124 of network node 102 at hub site 103, and communicated to a customer premises equipment device, e.g., CPR device 1 104, to be used to control communications between the network node and the CPE device. First column 302 includes communications schedule 1 information. Column portion 302a identifies applications; column portion 302b identifies, using indicators, whether the cable modem (CM) or the wireless interface (WI) communications link is to be used for uplink communications for each application for the duration of time in which communications schedule 1 is to be implemented; and column portion 302c identifies, using indicators, whether the cable modem (CM) or the wireless interface (WI) is to be used for downlink communications for each application for the duration of time in which communications schedule 1 is to be implemented. Row 301 identifies column header information in the table. Row 303, column 302 information conveys that the web browser application is to use the cable modem communications channel for uplink communications and the cable modem communications channel for downlink communications. Row 305, column 302 information conveys that the voice call application is to use the cable modem communications channel for uplink communications and the cable modem communications channel for downlink communications. Row 307, column 302 information conveys that the HD video content creation application is to use the wireless communications channel for uplink communications and the cable modem communications channel for downlink communications. Row 309, column 302 information conveys that application Z, e.g., a video display application, is to use the wireless communications channel for uplink communications and the wireless communications channel for downlink communications.

Second column 304 includes communications schedule 2 information. In one exemplary embodiment communications schedule 2 is generated in response to a detected change, e.g., a degradation, in wireless link quality. Column portion 304a identifies applications; column portion 304b identifies, using indicators, whether the cable modem (CM)

or the wireless interface (WI) is to be used for uplink communications for each application for the duration of time in which communications schedule 2 is to be implemented; and column portion 304c identifies, using indicators, whether the cable modem (CM) or the wireless interface (WI) is to be used for downlink communications for each application for the duration of time in which communications schedule 2 is to be implemented. Row 303, column 304 information conveys that the web browser application is to use the cable modem communications channel for uplink communications and the cable modem communications channel for downlink communications. Row 305, column 304 information conveys that the voice call application is to use the cable modem communications channel for uplink communications and the cable modem communications channel for downlink communications. Row 307, column 304 information conveys that the HD video content creation application is to use the wireless communications channel for uplink communications and the cable modem communications channel for downlink communications. Row 309, column 304 information conveys that application Z, e.g., a video display application, is to use the cable modem communications channel for uplink communications and the cable modem communications channel for downlink communications.

Third column 306 includes communications schedule 3 information. In one exemplary embodiment communications schedule 3 is generated in response to planned cable related maintenance, e.g., cable modem maintenance, cable modem interface maintenance, or cable modem cable maintenance, or a detected cable modem related failure, e.g., a failure of cable modem interface 120, a failure of cable mode 152 or a failure of cable 133. Column portion 306a identifies applications; column portion 306b identifies, using indicators, whether the cable modem (CM) or the wireless interface (WI) is to be used for uplink communications for each application for the duration of time in which communications schedule 3 is to be implemented; and column portion 306c identifies, using indicators, whether the cable modem (CM) or the wireless interface (WI) is to be used for downlink communications for each application for the duration of time in which communications schedule 3 is to be implemented. Row 303, column 306 information conveys that the web browser application is to use the wireless communications channel for uplink communications and the wireless communications channel for downlink communications. Row 305, column 306 information conveys that the voice call application is to use the wireless communications channel for uplink communications and the wireless communications channel for downlink communications. Row 307, column 306 information conveys that the HD video content creation application is to use the wireless communications channel for uplink communications and the wireless communications channel for downlink communications. Row 309, column 306 information conveys that application Z, e.g., a video display application, is to use the wireless communications channel for uplink communications and the wireless communications channel for downlink communications.

Fourth column 308 includes communications schedule 4 information. In one exemplary embodiment communications schedule 4 is generated in response to planned wireless maintenance, e.g., wireless interface 118 maintenance, wireless interface 150 maintenance, antenna 119 maintenance, antenna 151 maintenance, or a detected wireless communications related failure, e.g., a failure of wireless interface 118, a failure of wireless interface 150, etc. Column portion 308a identifies applications; column portion 308b identifies, using indicators, whether the cable modem (CM) or the wireless interface (WI) is to be used for uplink communications for each application for the duration of time in which communications schedule 4 is to be implemented; and column portion 308c identifies, using indicators, whether the cable modem (CM) or the wireless interface (WI) is to be used for downlink communications for each application for the duration of time in which communications schedule 4 is to be implemented. Row 303, column 308 information conveys that the web browser application is to use the cable modem communications channel for uplink communications and the cable modem communications channel for downlink communications. Row 305, column 308 information conveys that the voice call application is to use the cable modem communications channel for uplink communications and the cable modem communications channel for downlink communications. Row 307, column 308 information conveys that the HD video content creation application is to use the cable modem communications channel for uplink communications and the cable modem communications channel for downlink communications. Row 309, column 308 information conveys that application Z, e.g., a video display application, is to use the cable modem communications channel for uplink communications and the cable modem communications channel for downlink communications.

Fifth column 310 includes communications schedule 5 information. In one exemplary embodiment communications schedule 5 is generated in response to a detected wireless uplink failure, e.g., a detected failure of wireless receiver 134 or a detected failure of the wireless transmitter in wireless interface 150. Column portion 310a identifies applications; column portion 310b identifies, using indicators, whether the cable modem (CM) or the wireless interface (WI) is to be used for uplink communications for each application for the duration of time in which communications schedule 5 is to be implemented; and column portion 310c identifies, using indicators, whether the cable modem (CM) or the wireless interface (WI) is to be used for downlink communications for each application for the duration of time in which communications schedule 5 is to be implemented. Row 303, column 310 information conveys that the web browser application is to use the cable modem communications channel for uplink communications and the cable modem communications channel for downlink communications. Row 305, column 310 information conveys that the voice call application is to use the cable modem communications channel for uplink communications and the cable modem communications channel for downlink communications. Row 307, column 310 information conveys that the HD video content creation application is to use the cable modem communications channel for uplink communications and the cable modem communications channel for downlink communications. Row 309, column 310 information conveys that application Z, e.g., a video display application, is to use the cable modem communications channel for uplink communications and the wireless communications channel for downlink communications.

Sixth column 312 includes communications schedule 6 information. In one exemplary embodiment communications schedule 6 is generated in response to a detected wireless downlink failure, e.g., a detected failure of wireless transmitter 136 or a detected failure of the wireless receiver in wireless interface 150. Column portion 312a identifies applications; column portion 312b identifies, using indicators, whether the cable modem (CM) link or the wireless interface (WI) is to be used for uplink communications for each application for the duration of time in which communications schedule 6 is to be implemented; and column portion 312c identifies, using indicators, whether the cable modem (CM) or the wireless interface (WI) is to be used for downlink communications for each application for the duration of time in which communications schedule 6 is to be implemented. Row 303, column 312 information conveys that the web browser application is to use the cable modem communications channel for uplink communications and the cable modem communications channel for downlink communications. Row 305, column 312 information conveys that the voice call application is to use the cable modem communications channel for uplink communications and the cable modem communications channel for downlink communications. Row 307, column 312 information conveys that the HD video content creation application is to use the wireless communications channel for uplink communications and the cable modem communications channel for downlink communications. Row 309, column 312 information conveys that application Z, e.g., a video display application, is to use the wireless communications channel for uplink communications and the cable modem communications channel for downlink communications.

Seventh column 314 includes communications schedule 7 information. In one exemplary embodiment communications schedule 7 is generated in response to a detected cable modem uplink failure. Column portion 314a identifies applications; column portion 314b identifies, using indicators, whether the cable modem (CM) or the wireless interface (WI) is to be used for uplink communications for each application for the duration of time in which communications schedule 7 is to be implemented; and column portion 314c identifies, using indicators, whether the cable modem (CM) or the wireless interface (WI) is to be used for downlink communications for each application for the duration of time in which communications schedule 7 is to be implemented. Row 303, column 314 information conveys that the web browser application is to use the wireless communications channel for uplink communications and the cable modem communications channel for downlink communications. Row 305, column 314 information conveys that the voice call application is to use the wireless communications channel for uplink communications and the cable modem communications channel for downlink communications. Row 307, column 314 information conveys that the HD video content creation application is to use the wireless communications channel for uplink communications and the cable modem communications channel for downlink communications. Row 309, column 314 information conveys that application Z, e.g., a video display application, is to use the wireless communications channel for uplink communications and the wireless communications channel for downlink communications.

Eighth column 316 includes communications schedule 8 information. In one exemplary embodiment communications schedule 8 is generated in response to a detected cable modem downlink failure. Column portion 316a identifies applications; column portion 316b identifies, using indicators, whether the cable modem (CM) or the wireless interface (WI) is to be used for uplink communications for each application for the duration of time in which communications schedule 8 is to be implemented; and column portion 316c identifies, using indicators, whether the cable modem (CM) or the wireless interface (WI) is to be used for downlink communications for each application for the duration of time in which communications schedule 8 is to be implemented. Row 303, column 316 information conveys that the web browser application is to use the cable modem communications channel for uplink communications and the wireless communications channel for downlink communications. Row 305, column 316 information conveys that the voice call application is to use the cable modem communications channel for uplink communications and the wireless communications channel for downlink communications. Row 307, column 316 information conveys that the HD video content creation application is to use the wireless communications channel for uplink communications and the wireless communications channel for downlink communications. Row 309, column 316 information conveys that application Z, e.g., a video display application, is to use the wireless communications channel for uplink communications and the wireless communications channel for downlink communications.

Figure 4:
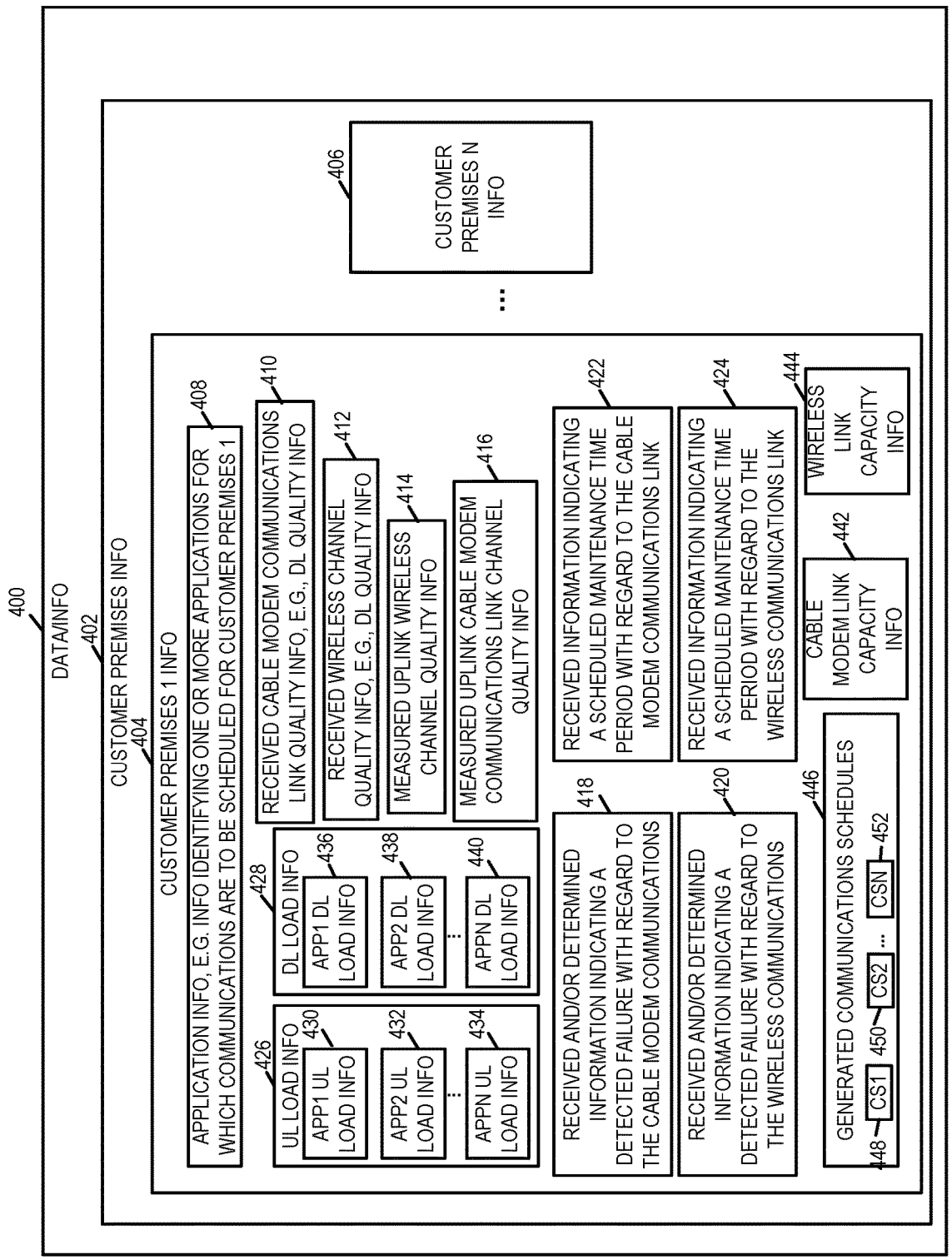
FIG. 4 is a drawing of exemplary data and information which may be included in an exemplary network node, e.g., a hubsite network node, in accordance with an exemplary embodiment.

FIG. 4 is a drawing of exemplary data and information 400 which may be included in an exemplary network node in accordance with an exemplary embodiment. Data/information 400 is, e.g., data/information 144, included in memory 128 of network node 102 of hub site 103 of system 100 of FIG. 1. Data/information 400 includes customer premises information 402. Customer premises information 402 includes sets of information (customer premises 1 information 404, . . . , customer premises N information 406) corresponding to each of the customer premises sites being serviced by the network node, e.g., network node 102, including data/information 400.

Customer premises 1 information 402 includes application information 408, e.g., information identifying one or more applications for which communications are to be scheduled for customer premises 1, received cable modem communications link quality information 410, received wireless channel quality information 412, measured uplink wireless channel quality information 414, measured uplink cable modem communications link channel quality information 416, received and/or determined information indicating a detected failure with regard to the cable modem communications 418, received and/or determined information indicating a detected failure with regard to the wireless communications 420, received information indicating a scheduled maintenance time period with regard to the cable modem link communications 422, received information indicating a scheduled maintenance time period with regard to the wireless communications link 424, uplink (UL) load information 426, downlink (DL) load information 428, cable modem link capacity information 442, wireless link capacity information 444, and generated communications schedules 446.

Exemplary applications include, e.g., a voice call application, a HD video content creation application, a Web browser, and a video display application. In some embodiments, the received application information 408 includes information identifying approximate UL and DL loading requirements corresponding to the different identified applications.

Received cable modem communications link quality information 410 includes, e.g., feedback information such as packet error rate or interference measurement information sent via the cable mode or over the wireless link providing interference information and/or error rate information for the cable modem downlink. Received wireless channel quality information 412 includes, e.g., downlink quality information such as interference information and/or error rate information for the wireless downlink sent as feedback over the wireless connector or over the cable modem connection to the network node.

Measured uplink wireless channel quality information 414 includes, e.g., measurements performed by the network node of the uplink channel quality of the wireless communications link with the first customer premises, e.g., based on interference that the network node detects. Measured uplink cable modem communications link channel quality information 416 includes, e.g., measurements performed by the network node of the uplink channel quality of the cable modem communications link with the first customer premises, e.g., based on interference that the network node detects.

UL load information 426 includes, e.g., received uplink queue information for one or more applications and links, which may be received via the wireless communications link and/or the cable modem communications link. DL load information 428 includes, e.g., downlink queue information for one or more applications and links.

UL load information 426 includes UL load information corresponding to one or more applications being run at the customer premises 1 (application 1 UL load information 430, application 2 UL load information 432, . . . , application N UL load information 434). DL load information 428 includes DL load information corresponding to one or more applications being run at the customer premises 1 (application 1 DL load information 436, application 2 DL load information 438, . . . , application N DL load information 440).

Generated communication schedules 446 includes a plurality of different communications schedules (communications schedule 1 (CS1) 448, communications schedule 2 (CS2) 450, . . . , communications schedule N (CSN) 452), for communications between the network node, e.g., network node 102 and customer premises 1. Different communications schedules may cover different time periods. A communications schedule may be generated, e.g., by scheduler 124, in response to and/or may reflect changing conditions, e.g., a change in application being used, a change in channel conditions, a change in loading conditions, a detected failure, a degradation in a communication link quality, scheduled maintenance time periods, etc. In various embodiments a generated communications schedule is communicated to the customer premises. In one exemplary embodiment, CS1 448 in network node 102 is the same as CS1 167 in CPE device 1 104; CS1 448 in network node 102 is the same as CS2 168 in CPE device 1 104; and CS N 448 in network node 102 is the same as CSN 169 in CPE device 1 104.

Figure 5A:
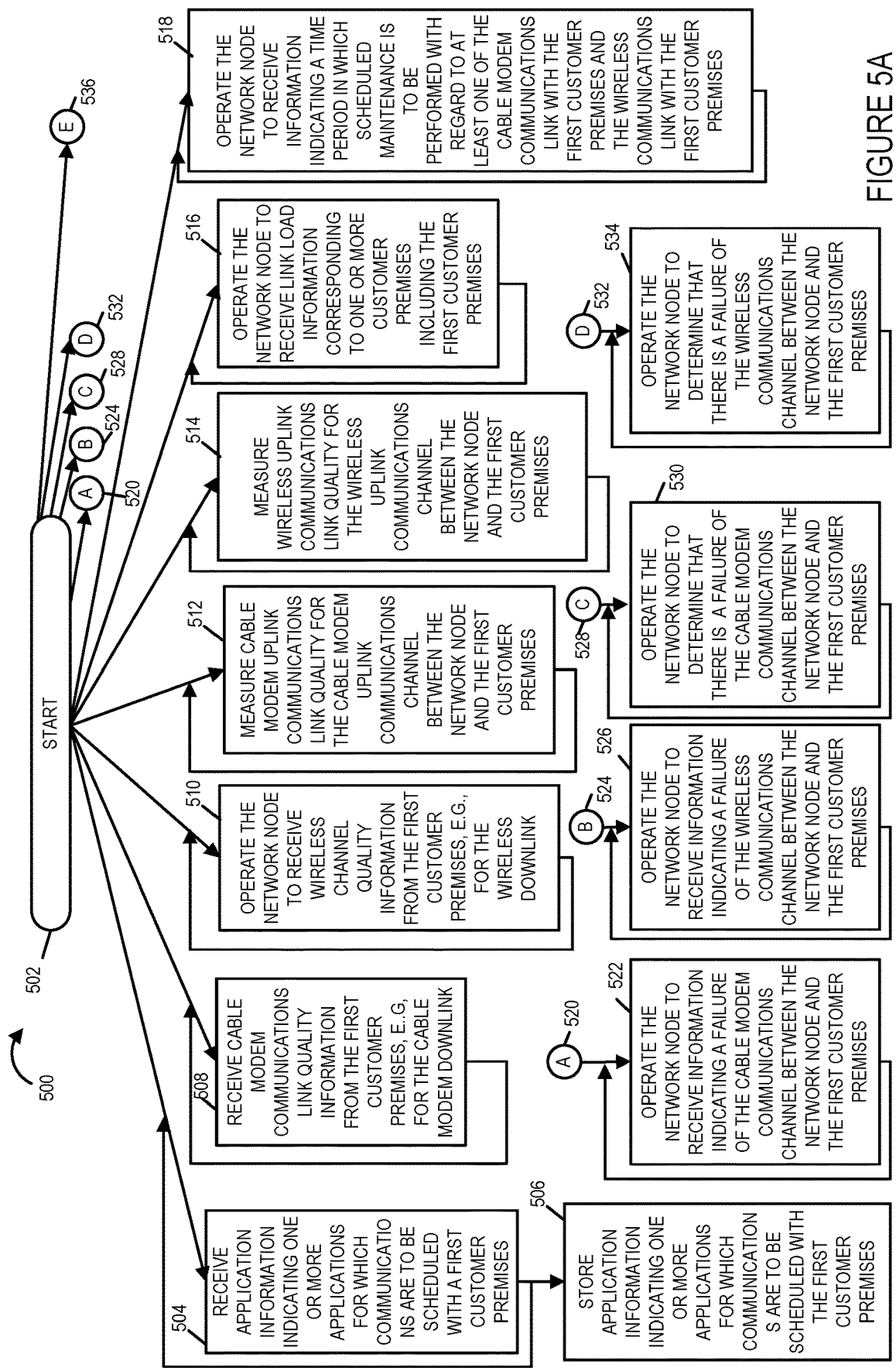
FIG. 5A is a first part of a flowchart of an exemplary communications method in accordance with an exemplary embodiment.
Figures 5, 5B:
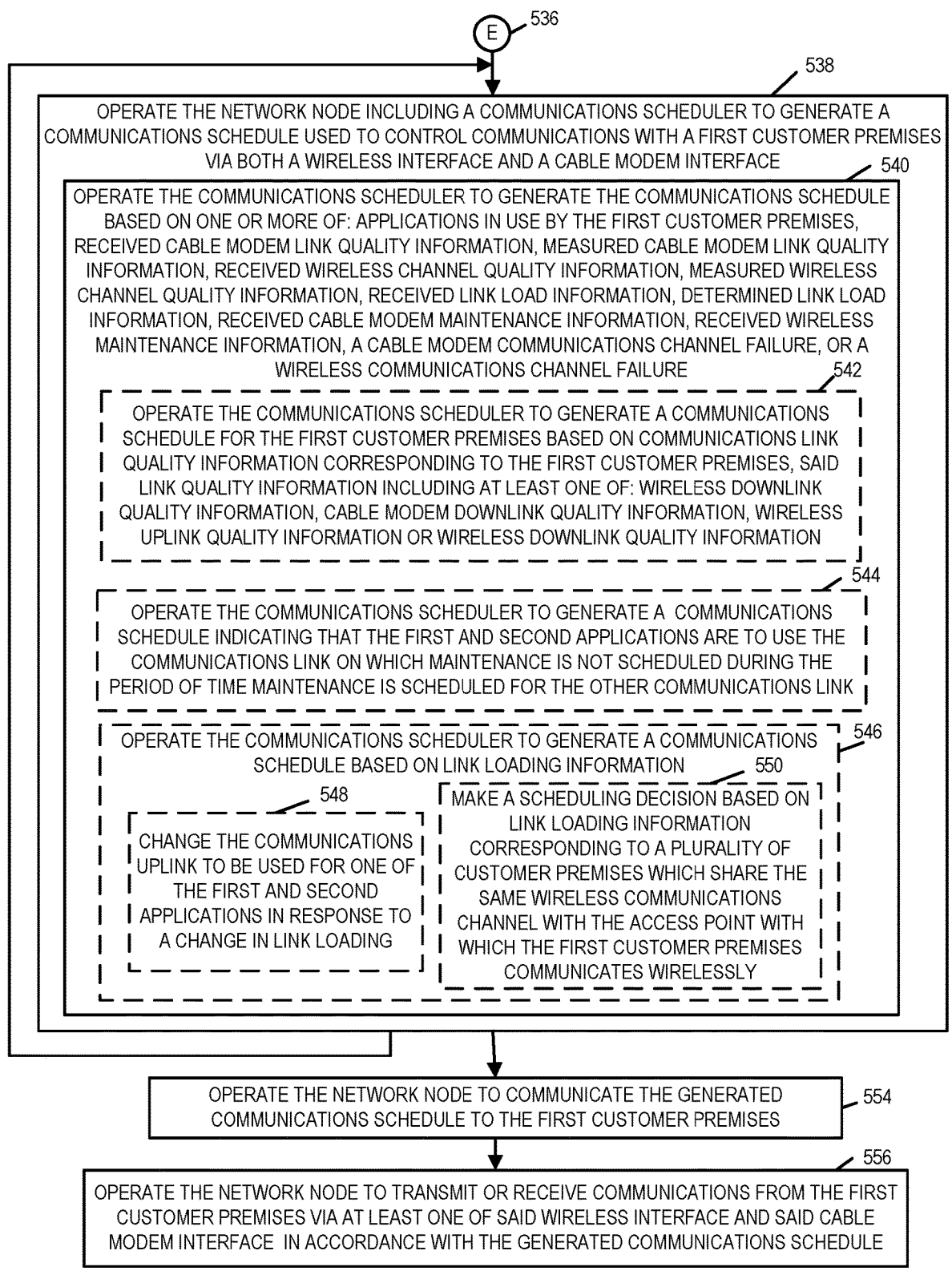
FIG. 5B is a second part of a flowchart of an exemplary communications method in accordance with an exemplary embodiment.
FIG. 5 comprises the combination of FIG. 5A and FIG. 5B.

FIG. 5, comprising the combination of FIG. 5A and FIG. 5B, is a flowchart 500 of an exemplary communications method in accordance with an exemplary embodiment. Operation starts in step 502 in which a network node, e.g., network node 102 of system 100 of FIG. 1, is powered on and initialized. Operation proceeds from step 502 to: step 504, step 508, step 510, step 512, step 514, step 516, step 518, step 522 via connecting node A 520, step 526 via connecting node B 524, step 530 via connecting node C 528, step 534 via connecting node D 532, and step 538 via connecting node E 536.

In step 504 the network node is operated to receive application information indicating one or more applications for which communications are to be scheduled with a first customer premises. Operation proceeds from step 504 to step 506 in which the network node stores application information indicating one or more applications for which communications are to be scheduled with the first customer premises.

In step 508 the network node is operated to received cable modem communications link quality information from the first customer premises, e.g., for the cable modem downlink. For example, feedback information such as packet error rate or interference measurement is sent via the cable modem or over the wireless link providing interference information and/or error rate information for the cable modem downlink.

In step 510 the network node is operated to receive wireless channel quality information from the first customer premises, e.g., for the wireless downlink. For example, downlink quality information such as interference information and/or error rate information for the wireless downlink is sent as feedback information from the first customer premises over the wireless connection and/or over the cable modem link to the network node. Thus, the feedback for the wireless link can go over either link, e.g. can go over the other link, e.g., cable modem link, in addition or in place of going over the wireless link to which the feedback relates. This facilities link quality information regarding a poor quality wireless link being communicated to the network node, e.g., by using a good quality modem link.

In step 512 the network node is operated to measure cable modem uplink communications link quality for the cable module uplink communications channel between the network node and the first customer premises, e.g., based on interference it detects.

In step 514 the network node is operated to measure wireless uplink communications link quality for the wireless uplink communications channel between the network node and the first customer premises, e.g., based on interference it detected.

In step 516 the network node is operated to receive link load information corresponding to one or more customer premises including the first customer premises. For example, the network node receives uplink queue information for one or more applications and links via the wireless communications link and/or cable modem communications link.

In step 518 the network node is operated to receive information indicating a time period in which scheduled maintenance is to be performed with regard to at least one of the cable modem communications link with the first customer premises and the wireless communications link with the first customer premises.

In step 522 the network node is operated to receive information indicating a failure of the cable modem communications channel between the network node and the first customer premises.

In step 526 the network node is operated to receive information indicating a failure of the wireless communications channel between the network node and the first customer premises.

In step 530 the network node is operated to determine that there is a failure of the cable mode communications channel between the network node and the first customer premises, e.g., based on a self test.

In step 534 the network node is operated to determine that there is a failure of the wireless communications channel between the network node and the first customer premises, e.g., based on a self test.

Steps 504, 506, 508, 510, 512, 514, 516, 518, 522, 526, 530 and 532 are performed on an ongoing, e.g., recurring basis, e.g., in response to new information. Different ones of steps 504, 506, 508, 510, 512, 514, 516, 518, 522, 526, 530 and 532 may be performed at different times and/or different rates.

In step 538 the network node including a communications scheduler is operated to generate a communications schedule used to control communications with a first customer premises via both a wireless interface and a cable modem interface. Step 538 is performed on a recurring basis, e.g., generating a new, e.g. different, communications schedule to be used, e.g., in response in a detected change in applications used, loading, channel condition, a detected failure, and/or scheduled maintenance.

Step 540 includes step 542, in which the communications scheduler is operated to generate a communications schedule based on one or more of: applications in use by the first customer premises, received cable modem link quality information, measured cable modem link quality information, received wireless channel quality information, measured wireless channel quality information, received link load information, determined link load information, received cable modem maintenance information, received wireless maintenance information, a detected cable modem channel failure, or a detected wireless communications channel failure.

Step 542 may, and sometimes does, include one or more of steps 542, 544 and 546. In some embodiments, different ones of steps 542, 544 and 546 are performed in different iterations of step 540.

In step 542 the communications scheduler is operated to generate a communications schedule for the first communications premises based on communications link quality information corresponding to the first customer premises, said link quality information including at least one of: wireless downlink quality information, cable modem downlink quality information, wireless uplink link quality information, or wireless downlink link quality information.

In step 544 the communications scheduler is operated to generate a communications schedule indicating that the first and second applications are to use the communications link on which maintenance is not scheduled during the period of time maintenance is scheduled for the other communications link.

In step 546 the communications scheduler is operated to generate a communications schedule based on link loading information. In some embodiments, step 546 includes one or both of step 548 and 550. In step 546 the communications scheduler changes the communications uplink to be used for one of the first and second applications in response to a change in link loading. In step 550 the communications scheduler makes a scheduling decision based on link loading information corresponding to a plurality of customer premises which share the same wireless communications channel with the access point with which the first customer premises communications wirelessly.

In some embodiments, a communications schedule includes information on a per application and customer premise basis indicating whether an application is to use the wireless interface or cable mode interface for a scheduled communications time period. FIG. 3 illustrates some exemplary generated communications schedules.

In one exemplary embodiment, a first generated communications schedule includes an uplink schedule portion and a downlink schedule portion, said uplink schedule portion including one or more identifiers, said one or more identifiers identifying on a per application basis one of the wireless interface or cable module interface to be used by the first customer premises for uplink communications corresponding to a first application. For example, the first application may be a HD video content creation application and wireless interface uplink may be used for transmission of content created for the application because of large size, e.g., when content is posted to a content distributer or sent to another party for further editing/processing. In some embodiments, said uplink schedule portion further includes a second uplink identifier identifying one of the wireless interface or cable modem interface to be used by the first customer premises for uplink communications corresponding to a second application, e.g., Internet web browser or voice call application, and second application communications will be sent using cable modem. In one embodiment, the first application is a HD video content creation application and said first uplink identifier identifies the wireless interface as the interface to be used for uplink communications corresponding to the first application.

In some embodiments, the downlink schedule portion includes a first downlink identifier that identifies one of the one of the wireless interface or cable modem interface to be used for downlink communications corresponding to the first application, the identified one of the wireless interface or cable modem interface to be used for downlink communications for the first application being the same or different than the identified one of the wireless interface or cable modem interface to be used for uplink communications for the first application. In some such embodiments, the downlink schedule portion includes a second downlink identifier that identifies one of the one of the wireless interface or cable modem interface to be used for downlink communications corresponding to the second application, the identified one of the wireless interface or cable modem interface to be used for downlink communications for the second application being the same or different than the identified one of the wireless interface or cable modem interface to be used for uplink communications for the second application.

In one embodiment, during one iteration of generating a communications schedule, the communications link quality, e.g. used as an input in the scheduling decision, indicates a degradation of link quality on the cable modem communications link and a communications schedule, e.g., a second communications schedule, is generated which includes an indicator indicating that at least one of the first and second applications at the first customer premises is to switch from the cable modem communications link to the wireless communications link for at least one of uplink and downlink communications corresponding to the first application, e.g., by including a different link indicator than in the first schedule the schedule indicates the change. In some such embodiments, the indicated degradation of link quality indicates increased interference on the link or a complete failure of the communications link. In some such embodiments, if the link quality indicates a complete failure of the communications link none of the applications are assigned to used the failed link, e.g., the applications are offloaded to the still properly operating link.

Operation proceeds from step 538 to step 554, in which the network node is operated to communicate the generated communications schedule to the first customer premises. Operation proceeds from step 554 to step 556, in which the network node is operated to transmit or receive communications from the first customer premises via at least one of said wireless interface and said cable modem interface in accordance with the generated communications schedule.

Figure 6A:
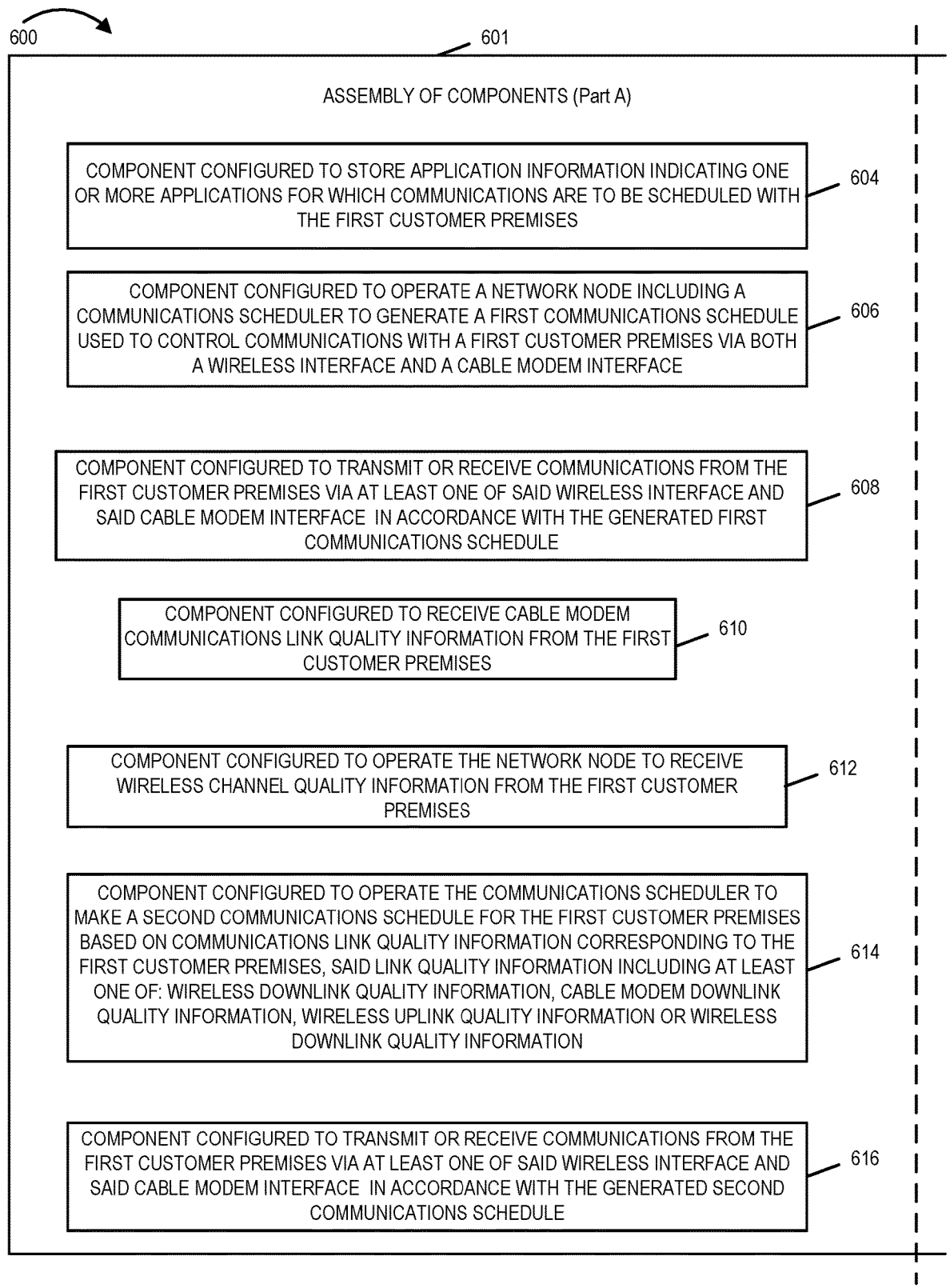
FIG. 6A is a drawing of a first part of an assembly of components, which may be included in a network node, e.g., a hubsite network node, in accordance with an exemplary embodiment.
Figures 6, 6B:
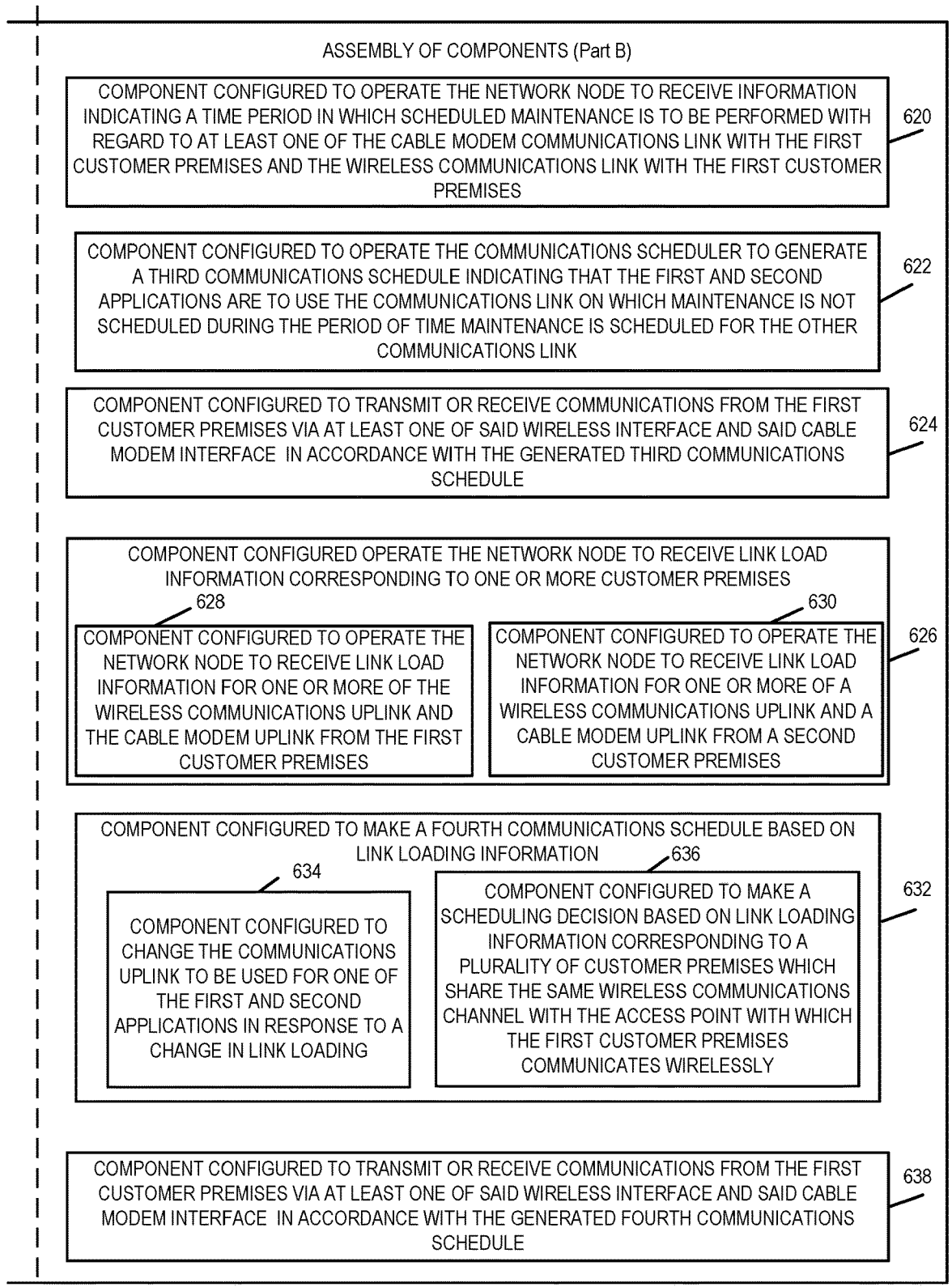
FIG. 6B is a drawing of a second part of an assembly of components, which may be included in a network node, e.g., a hubsite network node, in accordance with an exemplary embodiment.
FIG. 6 comprises the combination of FIG. 6A and FIG. 6B.

FIG. 6 is a drawing of an exemplary assembly of components 600 which may be included in an exemplary network node, e.g., exemplary network node 102 of hub site 103 of communications system 100 of FIG. 1, in accordance with an exemplary embodiment. The components in the assembly of components 600 can, and in some embodiments are, implemented fully in hardware within a processor, e.g., processor 122, e.g., as individual circuits. The components in the assembly of components 600 can, and in some embodiments are, implemented fully in hardware within the assembly of hardware components 126, e.g., as individual circuits corresponding to the different components. In other embodiments some of the components are implemented, e.g., as circuits, within processor 122 with other components being implemented, e.g., as circuits within assembly of components 126, external to and coupled to the processor 122. As should be appreciated the level of integration of components on the processor and/or with some components being external to the processor may be one of design choice. Alternatively, rather than being implemented as circuits, all or some of the components may be implemented in software and stored in the memory 128 of the network node 102, with the components controlling operation of network node 102 to implement the functions corresponding to the components when the components are executed by a processor e.g., processor 122. In some such embodiments, the assembly of components 600 is included in the memory 128 as assembly of software components 142. In still other embodiments, various components in assembly of components 600 are implemented as a combination of hardware and software, e.g., with another circuit external to the processor providing input to the processor which then under software control operates to perform a portion of a component's function. In some embodiments some of the components in assembly of components 600 are implemented in a scheduler, e.g., in scheduler 124.

When implemented in software the components include code, which when executed by a processor, e.g., processor 122, configure the processor to implement the function corresponding to the component. In embodiments where the assembly of components 600 is stored in the memory 128, the memory 128 is a computer program product comprising a computer readable medium comprising code, e.g., individual code for each component, for causing at least one computer, e.g., processor 122, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the network node 102 or elements therein such as the processor 122 or the scheduler 124, to perform the functions of corresponding steps illustrated and/or described in the method of one or more of the flowcharts, signaling diagrams and/or described with respect to any of the Figures. Thus the assembly of components 600 includes various components that perform functions of corresponding one or more described and/or illustrated steps of an exemplary method, e.g., one or more steps of the method of FIG. 2.

One or more of the components in assembly of components 600 may be implemented in its entirety or in part in any of processor 122, in scheduler 124, in wireless access point 123, in fiber interface 116, in wireless interface 118, in cable modem interface 120, in assembly of hardware components 126, or in assembly of software components 142.

FIG. 6, comprising the combination of FIG. 6A, and FIG. 6B, is a drawing of an assembly of components 600, comprising the combination of Part A 601 and Part B 603, in accordance with an exemplary embodiment.

Assembly of components 600 includes a component 604 configured to store application information indicating one ore more application for which communications are to be scheduled with a first customer premises, a component 606 configure to operate a network node including a communications scheduler to generate a first communication schedule used to control communications with a first customer premises via both a wireless interface and a cable modem interface, a component and 608 configured to transmit or receive communications from the first customer premises via at least one of said wireless interface and said cable modem interface in accordance with the generated first communications schedule. Assembly of components 600 further includes a component 610 configured to receive cable modem communications link quality information from the first customer premises, a component 612 configured to operate the network node to receive wireless channel quality information from the first customer premises, a component 614 configured to operate the communications scheduler to make a second communications schedule for the first customer premises based on communications link quality information corresponding to the first customer premises, said link quality information including at least one of: wireless downlink quality information, cable modem downlink quality information, wireless uplink quality information or wireless downlink quality information, and a component 616 configured to transmit or receive communications from the first customer premises via at least one of said wireless interface and said cable modem interface in accordance with the generated second communications schedule.

Assembly of components 600 further includes a component 620 configured to operate the network node to receive information indicating a time period in which schedule maintenance is to be performed with regard to a least one of the cable module communications link with the first customer premises and the wireless communications link with the first customer premises, a component 622 configured to operate the communications scheduler to generate a third communications schedule indicating that the first and second applications are to use the communications link on which maintenance is not scheduled during the period of time maintenance is scheduled for the other communications link, and a component 624 configured to transmit or receive communications from the first customer premises via at least one or the wireless interface and said cable modem interface in accordance with the generated third communications schedule.

Assembly of components 600 further includes a component 626 configured to operate the network node to receive link loading information corresponding to one or more customer premises, a component 632 configured to make, e.g., generate, a fourth communications schedule based on link loading information, and a component 638 configured to transmit or receive communications from the first customer premises via at least one of the wireless interface and said cable modem interface in accordance with the generated fourth communications schedule. Component 626 includes a component 628 configured to operate the network node to receive link loading information for one or more of the wireless communications uplink and the cable modem uplink from the first customer premises and a component 630 configured to operate the network node to receive link loading information for one or more of a wireless communications uplink and a cable modem uplink from a second customer premises, e.g., receiving uplink queue information for one or more applications and links via the wireless communications link and/or cable modem communications link. Component 632 includes a component 634 configured to change the communications uplink to be used for one of the first and second application in response to a change in link loading, and a component 636 configured to make a scheduling decision based on link loading information corresponding to a plurality of customer premises which share the same wireless communications channel with the access point with which the first customer premises communications wirelessly.

In some embodiments, the generated communications schedules, e.g., the first communications schedule, includes information on a per application and customer premises basis indicating whether an application is to use the wireless interface or the cable modem interface for a scheduled communications time period. In some embodiments, a generated communications schedule, e.g., the first communications schedule includes an uplink schedule portion and a downlink schedule portion, said uplink schedule portion including one or more identifiers, said one or more identifiers identifying on a per application basis one of the wireless interface or cable module interface to be used by the first customer premises for uplink communications corresponding to a first application. In some embodiments, said uplink schedule portion further includes a second uplink identifier identifying one of the wireless interface or cable modem interface to be used by the first customer premises for uplink communications corresponding to a second application.

In one exemplary embodiment, the first application is a HD video content creation application and said first uplink identifier identifies the wireless interface as the interface to be used for uplink communications corresponding to the first application. In some embodiments, the downlink schedule portion includes a first downlink identifier that identifies one of the one of the wireless interface or cable modem interface to be used for downlink communications corresponding to the first application, the identified one of the wireless interface or cable modem interface to be used for downlink communications for the first application being the same or different than the identified one of the wireless interface or cable modem interface to be used for uplink communications for the first application. In some such embodiments, the downlink schedule portion includes a second downlink identifier that identifies one of the one of the wireless interface or cable modem interface to be used for downlink communications corresponding to the second application, the identified one of the wireless interface or cable modem interface to be used for downlink communications for the second application being the same or different than the identified one of the wireless interface or cable modem interface to be used for uplink communications for the second application.

In one exemplary embodiment, the received communications link quality, e.g., received by component 610, indicates a degradation of link quality on the cable modem communications link; and the second communications schedule, e.g., generated under the control of component 614, includes an indicator indicating that at least one of the first and second applications at the first customer premises is to switch from the cable modem communications link to the wireless communications link for at least one of uplink and downlink communications corresponding to the first application, e.g., by including a different link indicator than in the first schedule the schedule indicates the change. In some embodiments, the indicated degradation of link quality indicates increased interference on the link or a complete failure of the communications link.

FIG. 7 is a drawing of an exemplary assembly of components 700 which may be included in an exemplary network node, e.g., exemplary network node 102 of hub site 103 of communications system 100 of FIG. 1, in accordance with an exemplary embodiment. The components in the assembly of components 700 can, and in some embodiments are, implemented fully in hardware within a processor, e.g., processor 122, e.g., as individual circuits. The components in the assembly of components 700 can, and in some embodiments are, implemented fully in hardware within the assembly of hardware components 126, e.g., as individual circuits corresponding to the different components. In other embodiments some of the components are implemented, e.g., as circuits, within processor 122 with other components being implemented, e.g., as circuits within assembly of components 126, external to and coupled to the processor 122. As should be appreciated the level of integration of components on the processor and/or with some components being external to the processor may be one of design choice. Alternatively, rather than being implemented as circuits, all or some of the components may be implemented in software and stored in the memory 128 of the network node 102, with the components controlling operation of network node 102 to implement the functions corresponding to the components when the components are executed by a processor e.g., processor 122. In some such embodiments, the assembly of components 700 is included in the memory 128 as assembly of software components 142. In still other embodiments, various components in assembly of components 700 are implemented as a combination of hardware and software, e.g., with another circuit external to the processor providing input to the processor which then under software control operates to perform a portion of a component's function. In some embodiments some of the components in assembly of components 700 are implemented in a scheduler, e.g., in scheduler 124.

When implemented in software the components include code, which when executed by a processor, e.g., processor 122, configure the processor to implement the function corresponding to the component. In embodiments where the assembly of components 700 is stored in the memory 128, the memory 128 is a computer program product comprising a computer readable medium comprising code, e.g., individual code for each component, for causing at least one computer, e.g., processor 122, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the network node 102 or elements therein such as the processor 122 or the scheduler 124, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method, e.g., one or more steps of the method of FIG. 5.

One or more of the components in assembly of components 600 may be implemented in its entirety or in part in any of processor 122, in scheduler 124, in wireless access point 123, in fiber interface 116, in wireless interface 118, in cable modem interface 120, in assembly of hardware components 126, or in assembly of software components 142.

Figure 7A:
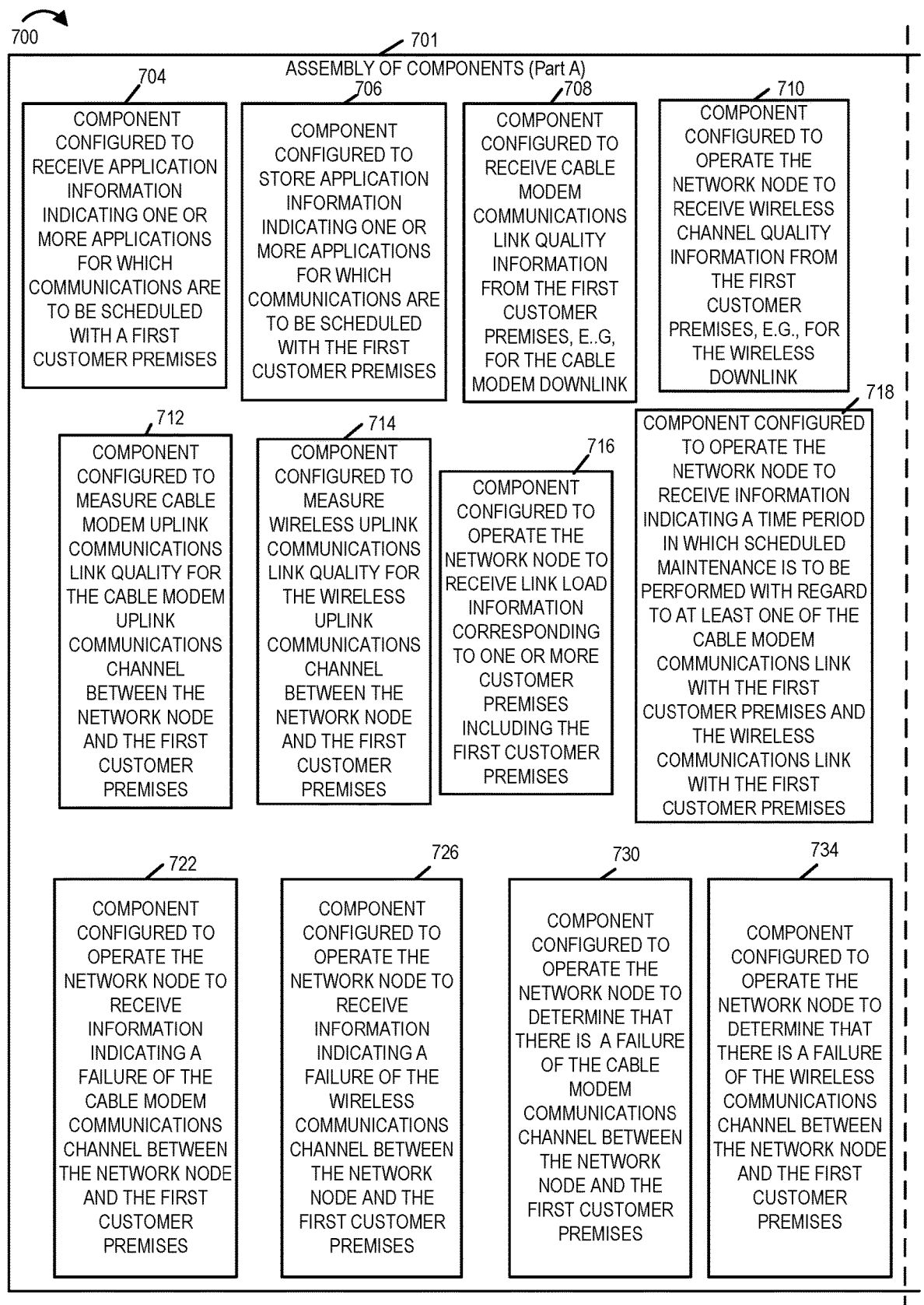
FIG. 7A is a drawing of a first part of an assembly of components, which may be included in a network node, e.g., a hubsite network node, in accordance with an exemplary embodiment.

FIG. 7, comprising the combination of FIG. 7A and FIG. 7B, is a drawing of an assembly of components 700, comprising the combination of Part A 701 and Part B 703, in accordance with an exemplary embodiment. Assembly of components 700 includes a component 704 configured to receive application information indicating one or more applications for which communications are to be schedule with a first customer premises, and a component 706 configured to store application information indicating one or more applications for which communications are to be scheduled with the first customer premises.

Assembly of components 700 further includes a component 708 configured to receive cable modem communications link quality information from the first customer premises, e.g., for the cable modem downlink, a component configured to operate the network node to receive wireless channel quality information from the first customer premises, e.g., for the wireless downlink, a component 712 configured to measure cable modem communications link quality for the cable modem uplink communications channel between the network node and the first customer premises, a component 714 configured to measure wireless uplink communications link quality for the wireless uplink communications channel between the network node and the first customer premises, a component and 716 configured to operate the network node to receive link load information corresponding to one or more customer premises including the first customer premises.

Assembly of components 700 further includes a component 718 configured to operate the network node to receive information indicating a time period is which schedule maintenance is to be performed with regard to at least one of the cable modem communications link with the first customer premises and the wireless communications link with the first customer premises, a component 722 configured to operate the network node to receive information indicating a failure of the cable modem communications channel between the network node and the first customer premises, a component configured to operate the network node to receive information indicating a failure of the wireless communications channel between the network node and the first customer premises, a component 730 configured to operate the network node to determine that there is a failure of the cable modem communications channel between the network node and the first customer premises, and a component 734 configured to operate the network node to determine that there is a failure of the wireless communications channel between the network node and the first customer premises.

Assembly of component 700 further includes a component configured to operate the network node including a communications scheduler to generate a communications schedule used to control communications with a first customer premises via both a wireless interface and a cable modem interface, a component 754 configured to operate the network node to communicate a generated communications schedule to the first customer preemies and a component 756 configured to operate the network node to transmit or receive communications from the first customer premises via at least one of said wireless interface and said cable mode interface in accordance with the generated communications schedule. Component 738 includes a component 740 configured to operate the communications schedule to generate the communications schedule based on one or more of: applications in use by the first customer premises, received cable modem link quality information, measured cable modem link quality information, received wireless channel link quality information, measured wireless channel quality information, received link load information, determined link load information, received cable modem maintenance information, received wireless maintenance information, a cable modem communications channel failure or a wireless communications channel failure. Component 740 includes a component 742 configured to operate the communications scheduler to generate a communications schedule for the first customer premises based on communications link quality corresponding to the first customer premises, said link quality information including at least one of: wireless downlink quality information, cable modem downlink quality information, wireless uplink quality information or wireless downlink quality information, a component 744 configured to operate the communications scheduler to generate a communications schedule indicating that the first and second applications are to use the communications link on which maintenance is not scheduled during the period of time maintenance is scheduled for the other communications link, and a component 746 configured to operate the communications scheduler to generate a communications schedule based on link loading information. Component 746 includes a component 748 configure to change the communications uplink to be used for one of the first and second applications in response to a change in link loading, and a component 750 configured to make a scheduling decision based on link loading information corresponding to a plurality of customer premises which share the same wireless communications channel with the access point with which the first customer premises communications wirelessly.

List of Set of Exemplary Numbered Method Embodiments:

Method Embodiment 1 A communications method, the method comprising: operating a network node including a communications scheduler to generate a first communications schedule used to control communications with a first customer premises via both a wireless interface and a cable modem interface; and transmitting or receiving communications from the first customer premises via at least one of said wireless interface and said cable modem interface in accordance with the generated first communications schedule.

Method Embodiment 2 The method of method embodiment 1, further comprising: storing application information indicating one or more applications for which communications are to be scheduled with the first customer premises; and wherein the first communications schedule includes information on a per application and customer premises basis indicating whether an application is to use the wireless interface or cable modem interface for a scheduled communications time period.

Method Embodiment 3 The method of method embodiment 2, wherein said first communications schedule includes an uplink schedule portion and a downlink schedule portion, said uplink schedule portion including one or more identifiers, said one or more identifiers identifying on a per application basis one of the wireless interface or cable module interface to be used by the first customer premises for uplink communications corresponding to a first application (e.g., first application may be a HD video content creation application and wireless interface uplink may be used for transmission of content created for the application because of large size, e.g., when content is posted to a content distributer or sent to another party for further editing/processing).

Method Embodiment 4 The method of method embodiment 3, wherein said uplink schedule portion further includes a second uplink identifier identifying one of the wireless interface or cable modem interface to be used by the first customer premises for uplink communications corresponding to a second application (e.g., Internet web browser or voice call application will be sent using cable modem).

Method Embodiment 5 The method of method embodiment 4, wherein said first application is a HD video content creation application and said first uplink identifier identifies the wireless interface as the interface to be used for uplink communications corresponding to the first application.

Method Embodiment 6 The method of method embodiment 3, wherein the downlink schedule portion includes a first downlink identifier that identifies one of the one of the wireless interface or cable modem interface to be used for downlink communications corresponding to the first application, the identified one of the wireless interface or cable modem interface to be used for downlink communications for the first application being the same or different than the identified one of the wireless interface or cable modem interface to be used for uplink communications for the first application.

Method Embodiment 7 The method of method embodiment 6, wherein the downlink schedule portion includes a second downlink identifier that identifies one of the one of the wireless interface or cable modem interface to be used for downlink communications corresponding to the second application, the identified one of the wireless interface or cable modem interface to be used for downlink communications for the second application being the same or different than the identified one of the wireless interface or cable modem interface to be used for uplink communications for the second application.

Method Embodiment 8 The method of method embodiment 7, further comprising: operating the communications scheduler to make a second communications schedule for the first customer premises based on communications link quality information corresponding to the first customer premises, said link quality information including at least one of: wireless downlink quality information, cable modem downlink quality information, wireless uplink quality information or wireless downlink quality information.

Method Embodiment 9 The method of method embodiment 8, further comprising: prior to the communications schedule making a second communications schedule for the first customer premises, operating the network node to receive wireless channel quality information, (e.g., downlink quality information such as interference information and/or error rate information for the wireless downlink sent as feedback information over the wireless connection or over the cable modem link to the access point—in some embodiments, the feedback for either link going over the other link in addition to or in place of the link to which the feedback relates) from the first customer premises.

Method Embodiment 10 The method of method embodiment 9, further comprising: receiving cable modem communications link quality information from the first customer premises (e.g., feedback information such as packet error rate or interference measurement sent via the cable modem or over the wireless link providing interference information and/or error rate information for the cable modem downlink). (Note in some embodiments the network node measures the uplink channel quality for the wireless and/or cable modem communications links with the first customer premises based on interference it detects.)

Method Embodiment 11 The method of method embodiment 8, wherein the communications link quality indicates a degradation of link quality on the cable modem communications link; and wherein the second communications schedule includes an indicator indicating that at least one of the first and second applications at the first customer premises is to switch from the cable modem communications link to the wireless communications link for at least one of uplink and downlink communications corresponding to the first application, e.g., by including a different link indicator than in the first schedule the schedule indicates the change.

Method Embodiment 12 The method of method embodiment 11, wherein the indicated degradation of link quality indicates increased interference on the link or a complete failure of the communications link.

Method Embodiment 13 The method of method embodiment 8 further comprising: operating the network node to receive information indicating a time period in which scheduled maintenance is to be performed with regard to at least one of the cable modem communications link with the first customer premises and the wireless communications link with the first customer premises; and operating the communications scheduler to generate a third communications schedule indicating that the first and second applications are to use the communications link on for which maintenance is not scheduled during the period of time maintenance is scheduled for the other communications link.

Method Embodiment 14 The method of method embodiment 8, further comprising: operating the network node to receive link load information for one or more of the wireless communications uplink and cable modem communications uplink from the first customer premises (e.g., receiving uplink queue information for one or more applications and links via the wireless communications link and/or cable modem communications link); and making a third communications schedule, said making a third communications schedule including changing the communications uplink to be used for one of the first and second applications in response to a change in link loading.

Method Embodiment 15 The method of method embodiment 14, wherein the scheduling decision is based on link loading information corresponding to a plurality of customer premises which share the same wireless communications channel with the access point with which the first customer premises communicates wirelessly.

List of Set of Exemplary Numbered Apparatus Embodiments:

Apparatus Embodiment 1 A network node comprising: a wireless interface; a cable modem interface; a communications scheduler; and a processor configured to: operate the communications scheduler included in the network node to generate a first communications schedule used to control communications with a first customer premises via both a wireless interface and a cable modem interface; and operate the network node to transmit or receive communications from the first customer premises via at least one of said wireless interface and said cable modem interface in accordance with the generated first communications schedule.

Apparatus Embodiment 2 The network node of apparatus embodiment 1, further comprising: memory including stored application information indicating one or more applications for which communications are to be scheduled with the first customer premises; and wherein the first communications schedule includes information on a per application and customer premises basis indicating whether an application is to use the wireless interface or cable modem interface for a scheduled communications time period.

Apparatus Embodiment 3 The network node of apparatus embodiment 2, wherein said first communications schedule includes an uplink schedule portion and a downlink schedule portion, said uplink schedule portion including one or more identifiers, said one or more identifiers identifying on a per application basis one of the wireless interface or cable module interface to be used by the first customer premises for uplink communications corresponding to a first application (e.g., the first application may be a HD video content creation application and wireless interface uplink may be used for transmission of content created for the application because of large size, e.g., when content is posted to a content distributer or sent to another party for further editing/processing).

Apparatus Embodiment 4 The network node of apparatus embodiment 3, wherein said uplink schedule portion further includes a second uplink identifier identifying one of the wireless interface or cable modem interface to be used by the first customer premises for uplink communications corresponding to a second application (e.g., the second applications is Internet web browser or voice call application and will be sent using cable modem which is identified by the second uplink identifier).

Apparatus Embodiment 5 The network node of apparatus embodiment 4, wherein said first application is a HD video content creation application and said first uplink identifier identifies the wireless interface as the interface to be used for uplink communications corresponding to the first application.

Apparatus Embodiment 6 The network node of apparatus embodiment 3, wherein the downlink schedule portion includes a first downlink identifier that identifies one of the one of the wireless interface or cable modem interface to be used for downlink communications corresponding to the first application, the identified one of the wireless interface or cable modem interface to be used for downlink communications for the first application being the same or different than the identified one of the wireless interface or cable modem interface to be used for uplink communications for the first application.

Apparatus Embodiment 7 The network node of apparatus embodiment 6, wherein the downlink schedule portion includes a second downlink identifier that identifies one of the one of the wireless interface or cable modem interface to be used for downlink communications corresponding to the second application, the identified one of the wireless interface or cable modem interface to be used for downlink communications for the second application being the same or different than the identified one of the wireless interface or cable modem interface to be used for uplink communications for the second application.

Apparatus Embodiment 8 The network node of apparatus embodiment 7, wherein said processor is further configured to: operate the communications scheduler to make a second communications schedule for the first customer premises based on communications link quality information corresponding to the first customer premises, said link quality information including at least one of: wireless downlink quality information, cable modem downlink quality information, wireless uplink quality information or wireless downlink quality information.

Apparatus Embodiment 9 The network node of apparatus embodiment 8, wherein said processor is further configured to: operate the network node to receive wireless channel quality information, (e.g., downlink quality information such as interference information and/or error rate information for the wireless downlink sent as feedback information over the wireless connection and/or over the cable modem link to the access point—the feedback for either link can and sometimes does go over the other link in addition to or in place of the link to which the feedback relates) from the first customer premises prior to the communications scheduler making a second communications schedule for the first customer premises.

Apparatus Embodiment 10 The network node of apparatus embodiment 9, wherein said processor is further configured to: operate the network node to receive cable modem communications link quality information from the first customer premises (e.g., feedback information such as packet error rate or interference measurement sent via the cable modem or over the wireless link providing interference information and/or error rate information for the cable modem downlink). (Note in some embodiments the network node measures the uplink channel quality for the wireless and/or cable modem communications links with the first customer premises based on interference it detects.)

Apparatus Embodiment 11 The network node of apparatus embodiment 8, wherein the communications link quality indicates a degradation of link quality on the cable modem communications link; and wherein the second communications schedule includes an indicator indicating that at least one of the first and second applications at the first customer premises is to switch from the cable modem communications link to the wireless communications link for at least one of uplink and downlink communications corresponding to the first application (e.g., by including a different link indicator than in the first schedule the schedule indicates the change).

Apparatus Embodiment 12 The network node of apparatus embodiment 11, wherein the indicated degradation of link quality indicates increased interference on the link or a complete failure of the communications link.

Apparatus Embodiment 13 The network node of apparatus embodiment 8, wherein said processor is further configured to: operate the network node to receive information indicating a time period in which scheduled maintenance is to be performed with regard to at least one of the cable modem communications link with the first customer premises and the wireless communications link with the first customer premises; and operate the communications scheduler to generate a third communications schedule indicating that the first and second applications are to use the communications link on for which maintenance is not scheduled during the period of time maintenance is scheduled for the other communications link.

Apparatus Embodiment 14 The network node of apparatus embodiment 8, wherein said processor is further configured to: operate the network node to receive link load information for one or more of the wireless communications uplink and cable modem communications uplink from the first customer premises (e.g., receiving uplink queue information for one or more applications and links via the wireless communications link and/or cable modem communications link); and operate the communications scheduler to make a third communications schedule, said making a third communications schedule including changing the communications uplink to be used for one of the first and second applications in response to a change in link loading.

Apparatus Embodiment 15 The network node of apparatus embodiment 14, wherein the scheduling decision is based on link loading information corresponding to a plurality of customer premises which share the same wireless communications channel with the access point with which the first customer premises communicates wirelessly.

List of Set of Exemplary Numbered Computer Readable Medium Embodiments:

Computer Readable Medium Embodiment 1 A non-transitory computer readable medium including computer executable instructions which when executed by one or more processors of a network node cause the network node to perform the steps of: operating the network node including a communications scheduler to generate a first communications schedule used to control communications with a first customer premises via both a wireless interface and a cable modem interface; and transmitting or receiving communications from the first customer premises via at least one of said wireless interface and said cable modem interface in accordance with the generated first communications schedule.

Various aspects and/or features of some embodiments are further discussed below. In some embodiments, the downlink and uplink coming from a cable modem termination system (CMTS), e.g., a cable network head end, are coupled at a downstream location, e.g., a network node at a hub site, where the DL and UL from the CMTS, have the option of traversing both Data Over Cable Service Interface Specification (DOCSIS) infrastructure, e.g., existing DOCSIS infrastructure, and wireless infrastructure, e.g., newly added wireless infrastructure, which couple the network node to a customer premises. In various embodiments, wireless and DOCSIS services are integrated at the customer premises, e.g., a subscriber's home or enterprise. In some such embodiments, the customer is unaware as to whether packets corresponding to an application were communicated over the DOCSIS infrastructure or the wireless infrastructure.

Various exemplary embodiments enable the following deployment options:
1. Decouple the DL and UL for the preferred service, e.g., DL on DOCSIS and UL on 5G new radio (NR), delivering a symmetrical service to the users.
2. Provide redundancy.
3. Offload the DOCSIS system communications onto the wireless system, e.g., onto the 5G NR, for scheduled maintenance of the DOCSIS system, and offload the wireless system communications onto the DOCSIS system for scheduled maintenance of the wireless system, thus continually providing uninterrupted service during scheduled maintenance intervals.
4. Balance traffic between DOCSIS system and the wireless system, e.g., NR system, past the node, e.g., past the network node at the hub site, during peak usage to maintain quality of service.

The techniques of various embodiments may be implemented using software, hardware and/or a combination of software and hardware. Various embodiments are directed to apparatus, e.g., user devices, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
    storing application information indicating one or more applications for which communications are to be scheduled with a first customer premises, said one or more applications running at the first customer premises;
    operating a network node including a communications scheduler to generate a first communications schedule used to control communications with the first customer premises via both a wireless interface and a second interface, said second interface being coupled to a cable used to communicate data to or from said first customer premises, the first communications schedule including information on a per application basis for a plurality of applications running at the first customer premises, said first communications schedule indicating whether an application running at the first customer premises is to use the wireless interface or the second interface for uplink communications during a scheduled communications time period;
    operating the network node to communicate the first communications schedule to a customer premises device located at the first customer premises; and
    transmitting or receiving communications from the first customer premises via at least one of said wireless interface and said second interface in accordance with the first communications schedule.

2. The communications method of claim 1, wherein said applications for which communications are to be scheduled include applications running at said first customer premises, said applications running at said first customer premises including a video content creation application and a Web Browser application.

3. The communications method of claim 1,
    wherein said first communications schedule includes an uplink schedule portion and a downlink schedule portion; and
    wherein said uplink schedule portion includes:
        a first identifier identifying for a first application running at the first customer premises one of the wireless interface or the second interface to be used for uplink communications corresponding to the first application, said first application being a web browser application; and
        a second identifier identifying for a second application running at the first customer premises one of the wireless interface or the second interface to be used for uplink communications corresponding to the second application, said second application being a video content creation application, said second identifier identifying a different interface than said first identifier.

4. The communications method of claim 3, further comprising:
    operating the network node including the communications scheduler to generate another communications schedule based on scheduled maintenance, said another communications schedule indicating for the first application running at the first customer premises a different one of the wireless interface or the second interface to be used for uplink communications corresponding to the first application than was indicated in the first communications schedule and indicating for the second application running at the first customer premises that the one of the wireless interface or the second interface indicated by the second identifier should be used.

5. The communications method of claim 3, wherein the downlink schedule portion further includes a first downlink identifier that identifies one of the wireless interface or the second interface to be used for downlink communications corresponding to the first application, the identified one of the wireless interface or the second interface to be used for downlink communications for the first application being the same or different than the identified one of the wireless interface or the second interface to be used for uplink communications for the first application.

6. The communications method of claim 5, wherein the downlink schedule portion includes a second downlink identifier that identifies one of the wireless interface or the second interface to be used for downlink communications corresponding to the second application, the identified one of the wireless interface or the second interface to be used for downlink communications for the second application being the same or different than the identified one of the wireless interface or the second interface to be used for uplink communications for the second application.

7. The communications method of claim 6, further comprising:
    operating the communications scheduler to make a second communications schedule for the first customer premises based on communications link quality information corresponding to the first customer premises, said communications link quality information including at least one of: wireless downlink quality information, cable downlink quality information, wireless uplink quality information or cable uplink quality information.

8. The communications method of claim 7, further comprising:
prior to the communications scheduler making a second communications schedule for the first customer premises, operating the network node to receive wireless channel quality information from the first customer premises.

9. The communications method of claim 7,
wherein the communications link quality indicates a degradation of link quality on a cable communications link; and
wherein the second communications schedule includes an indicator indicating that at least one of the first and second applications at the first customer premises is to switch from the cable communications link to a wireless communications link for at least one of uplink and downlink communications corresponding to the first application.

10. The communications method of claim 7, further comprising:
operating the network node to receive information indicating a time period in which scheduled maintenance is to be performed with regard to at least one of a cable communications link with the first customer premises and a wireless communications link with the first customer premises; and
operating the communications scheduler to generate a third communications schedule indicating that the first and second applications are to use the communications link on which maintenance is not scheduled during the period of time maintenance is scheduled for the other communications link.

11. The communications method of claim 7, further comprising:
operating the network node to receive link load information for one or more of a wireless communications uplink and a cable communications uplink from the first customer premises; and
making a third communications schedule, said making a third communications schedule including changing the communications uplink to be used for one of the first and second applications in response to a change in link loading.

12. The communications method of claim 11, wherein making the third communications schedule is based on link loading information corresponding to a plurality of customer premises which share the same wireless communications channel with an access point with which the first customer premises communicates wirelessly.

13. The communications method of claim 1, wherein storing application information indicating one or more applications for which communications are to be scheduled with the first customer premises includes:
storing, in memory, scheduling information indicating at least two different applications running at said first customer premises, said at least two different applications including a first application and a second application, the scheduling information indicating that uplink communications for said first application should be via a cable link and that uplink communications for the second application should be via a wireless link.

14. A network node comprising:
a wireless interface;
a second interface, said second interface being coupled to a cable used to communicate data to or from a first customer premises;
memory including stored application information indicating one or more applications for which communications are to be scheduled with the first customer premises, said one or more applications running at the first customer premises;
a communications scheduler;
a processor configured to:
operate the communications scheduler included in the network node to generate a first communications schedule used to control communications with the first customer premises via both the wireless interface and the second interface, the first communications schedule including information on a per application basis for a plurality of applications running at the first customer premises, said first communications schedule indicating whether an application running at the first customer premises is to use the wireless interface or the second interface for uplink communications during a scheduled communications time period;
operate the network node to communicate the first communications schedule to a customer premises device located at the first customer premises; and
operate the network node to transmit or receive communications from the first customer premises via at least one of said wireless interface and said second interface in accordance with the first communications schedule.

15. The network node of claim 14,
wherein said first communications schedule includes an uplink schedule portion and a downlink schedule portion, said uplink schedule portion including one or more identifiers, said one or more identifiers identifying on a per application basis one of the wireless interface or the second interface to be used by the first customer premises for uplink communications corresponding to a first application.

16. The network node of claim 15, wherein said uplink schedule portion further includes a second uplink identifier identifying one of the wireless interface or the second interface to be used by the first customer premises for uplink communications corresponding to a second application.

17. The network node of claim 15, wherein the downlink schedule portion includes a first downlink identifier that identifies one of the wireless interface or the second interface to be used for downlink communications corresponding to the first application, the identified one of the wireless interface or the second interface to be used for downlink communications for the first application being the same or different than the identified one of the wireless interface or the second interface to be used for uplink communications for the first application.

18. The network node of claim 17, wherein the downlink schedule portion includes a second downlink identifier that identifies one of the wireless interface or the second interface to be used for downlink communications corresponding to the second application, the identified one of the wireless interface or the second interface to be used for downlink communications for the second application being the same or different than the identified one of the wireless interface or the second interface to be used for uplink communications for the second application.

19. A non-transitory computer readable medium including computer executable instructions which when executed by one or more processors of a network node cause the network node to:
- store application information indicating one or more applications for which communications are to be scheduled with a first customer premises, said one or more applications running at the first customer premises;
- generate a first communications schedule used to control communications with the first customer premises via both a wireless interface and a second interface, the first communications schedule including information on a per application basis for a plurality of applications running at the first customer premises, said first communications schedule indicating whether an application running at the first customer premises is to use the wireless interface or the second interface for uplink communications during a scheduled communications time period, said second interface being coupled to a cable used to communicate data to or from said first customer premises;
- communicate the first communications schedule to a customer premises device located at the first customer premises; and
- transmit or receive communications from the first customer premises via at least one of said wireless interface and said second interface in accordance with the first communications schedule.

20. The non-transitory computer readable medium of claim 19, wherein said applications for which communications are to be scheduled include applications running at said first customer premises, said applications running at said first customer premises including a video content creation application and a Web Browser application.

* * * * *